United States Patent [19]
Betts

[11] Patent Number: 6,026,120
[45] Date of Patent: Feb. 15, 2000

[54] SYSTEM AND METHOD FOR USING CIRCULAR CONSTELLATIONS WITH UNCODED MODULATION

[75] Inventor: William L. Betts, St. Petersburg, Fla.

[73] Assignee: Paradyne Corp., Largo, Fla.

[21] Appl. No.: 08/915,980

[22] Filed: Aug. 21, 1997

Related U.S. Application Data

[60] Provisional application No. 60/039,851, Mar. 5, 1997, and provisional application No. 60/037,191, Mar. 6, 1997.

[51] Int. Cl.[7] .......................................... H04L 5/12
[52] U.S. Cl. ............................... 375/261; 375/219
[58] Field of Search .................... 371/43.2, 43.7, 371/43.8; 375/261, 295, 280, 265, 244; 341/61, 141

[56] References Cited

U.S. PATENT DOCUMENTS

| | | | |
|---|---|---|---|
| 4,669,090 | 5/1987 | Betts et al. | 375/8 |
| 4,744,092 | 5/1988 | Betts et al. | 375/7 |
| 4,891,823 | 1/1990 | Cole | 375/242 |
| 4,922,507 | 5/1990 | Simon et al. | 375/254 |
| 4,980,897 | 12/1990 | Decker et al. | 375/265 |
| 5,103,227 | 4/1992 | Betts | 341/61 |
| 5,159,610 | 10/1992 | Eyuboglu et al. | 375/290 |
| 5,233,629 | 8/1993 | Paik et al. | 375/262 |
| 5,329,552 | 7/1994 | De Couasnon et al. | 375/295 |
| 5,388,124 | 2/1995 | Laroia et al. | 375/286 |
| 5,394,439 | 2/1995 | Hemmati | 375/242 |
| 5,396,518 | 3/1995 | How | 375/265 |

*Primary Examiner*—Stephen Chin
*Assistant Examiner*—Joseph Roundtree
*Attorney, Agent, or Firm*—Thomas, Kayden, Horstemeyer & Risley

[57] ABSTRACT

A system and method for communicating information using circular multidimensional signal space constellations using uncoded modulation allows increased data rate and bandwidth by eliminating trellis encoding, thus reducing the number of computational cycles required for coding. Furthermore, the use of circular signal space constellations lowers the transmit peak factor, thus consuming less power. Using uncoded modulation with circular constellations allows an approximate 10–20% performance improvement for a given central processor unit. Additionally, circular constellations allow the easy and reliable transmission of special marker symbols such as "End of File", "Start of Message", "End of Transmission" or "Increase or Decrease Data Rate".

31 Claims, 6 Drawing Sheets

64 POINT CIRCULAR
CAP CONSTELLATION
WITH SPECIAL MARKER
SYMBOLS

64 POINT SQUARE
CAP CONSTELLATION

SYSTEM AND METHOD FOR USING CIRCULAR CONSTELLATIONS WITH UNCODED MODULATION

CROSS REFERENCE TO RELATED APPLICATION

This application claims priority to and the benefit of the filing date of copending and commonly assigned provisional application entitled CIRCULAR CONSTELLATIONS FOR UNCODED MODULATION, assigned Ser. No. 60/039,851, and filed Mar. 5, 1997 (Attorney Docket No. 61605-8320) and copending and commonly assigned provisional application entitled CIRCULAR PRECODING AND NON-LINEAR ENCODING assigned Ser. No. 60/037,191, and filed Mar. 6, 1997 (Attorney Docket No. 61605-8330) the text of both provisional applications being hereby incorporated by reference.

FIELD OF THE INVENTION

The present invention relates generally to data communications, and more particularly, to a system and method for communication using circular constellations with uncoded modulation.

BACKGROUND OF THE INVENTION

The field of data communications typically uses a modem to convey information from one location to another. Digital Subscriber Line (DSL) technology now enables modems to communicate large amounts of data. Modems communicate by modulating a baseband signal carrying digital data, converting the modulated digital data signal to an analog signal, and transmitting the analog signal over a conventional copper wire pair using techniques that are known in the art. These known techniques include mapping the information to be transmitted into a multidimensional signal space constellation. In some instances, a onedimensional signal space constellation can be employed, such as in the case of pulse amplitude modulation (PAM). The constellation can include both analog and digital information or only digital information.

In the above mentioned communications system, typically both digital data and an analog signal are to be transmitted. The data signal to be transmitted is represented by a sequence of data symbols, where each data symbol is associated with a particular N-dimensional signal point value taken from a signal space. Similarly, the analog signal, which for example can be represented by a voice signal, is processed so that it is mapped into the N-dimensional signal space to provide a voice signal point. This voice signal point defines the magnitude and angle of a voice signal vector about the origin of the signal space. The data symbol and the voice vector are then added together to select a resultant N-dimensional signal point. These N-dimensional signal points are grouped into either square or circular signal space constellations and then transmitted to a far-end modem.

Upon reception of the transmitted N-dimensional signal point, the receiver of the far-end modem detects the embedded data symbol and subtracts the data symbol from the received N-dimensional signal point to yield the voice signal vector. This voice signal vector is then used to recreate the voice signal.

Because square constellations have a higher peak factor, square constellations typically require more power to transmit a given amount of information than circular constellations. Square constellations also have a greater susceptibility to harmonic distortion. For example, in a 256 point two dimensional circular constellation, the constellation point, or symbol, with the highest power has the x, y coordinates 17, 5 with a peak power of $17^2+5^2=314$, whereas the highest power point in a square constellation has the x, y coordinates 15, 15 with a peak power Of $15^2+15^2=450$. As can be seen, the peak power of a circular constellation is 1.6 dB lower than that of a square constellation.

The modulation technique used to transmit the signal space constellation can be either coded or uncoded. Coded modulation entails encoding the data signal prior to transmission and decoding the received coded data signal in a receiver. Coded modulation such as coded quadrature amplitude modulation (QAM) as known in the art typically includes various forward error correction (FEC) techniques, such as block coding, convolutional coding and trellis coding. The FEC code acts on a discrete data channel whereby an encoder maps the source data to q-ary code symbols which are modulated and transmitted. During transmission, this signal can be corrupted, causing errors to arise in the demodulated symbol sequence. An FEC decoder attempts to correct these errors and restore the original source data. Trellis coding is presently considered state of the art for coded modulation. Coded modulation, however, consumes power and available bandwidth by requiring additional computational cycles by the system processor to provide the forward error correction code.

Previously, circular constellations have been implemented using coded modulation in which trellis coding is employed to reduce the error rate, and square constellations have been implemented using CAP modulation, which uses Tomlinson preceding to reduce the error rate. Transmitting a square constellation increases the peak factor of the transmitted signal, thus causing an increase in power consumption and harmonic distortion. Therefore, it would be beneficial to develop a way in which to transmit a circular signal space constellation in an uncoded modulation environment to maximize processor resources and improve efficiency.

SUMMARY OF THE INVENTION

Because of the processor resource savings realized by omitting the trellis coding steps, which consume processor cycles, uncoded modulation enables higher data rates, thus making more processor cycles available for the transmission of data. The present invention provides a system and method for modulation in a modem using circular constellations and uncoded modulation.

In a preferred embodiment of the present invention, an N bit word is supplied from an ISA bus to a register which separates the N bit word into an N–2 bit word and 2 additional bits. An International Standards Architecture (ISA) bus is an industry standard which eliminates the need for signal interfaces and is well known in the art. Based upon the data rate capacity of the channel, groups of 16 or 32 bit words are converted into frames of N bit words where N is determined by the data rate capacity of the channel. In order to allow the transmission of fractional bit rates as is known in the art of data communications, the register can optionally include a modulus converter or other means, such as constellation switching or shell mapping to enable the transmission of fractional bit rates. The N–2 bit word is next supplied to a mapper which maps the signal into a multidimensional circular signal space constellation. Optionally, an N bit word is supplied first to a scrambler. The scrambler performs an operation on the N bit word that results in a scrambled N bit word.

An additional feature of the present invention is the ability to transmit special marker symbols. A marker encoder receives special marker symbols such as "End of File", "Start of Message", "End of Transmission", or "Increase or Decrease Data Rate" and supplies them in the form of an encoded symbol "b", which is added to a value of $2^N$ and supplied to the register along with the N bit word.

Next, the signal is operated upon by a phase encoder which is designed to develop a rotation vector using the 2 additional bits supplied by the register. This rotation vector is combined in a rotator with the mapped N−2 bit vector representing the N−2 bit word to form the circular signal space constellation of the present invention and creates a phase rotated signal. Optionally, the phase encoder includes a differential encoder which encodes the 2 additional bits of the N bit word to develop 2 differential bits. These 2 differential bits are added to the 2 additional phase bits supplied from the register and become part of the rotation vector.

The phase rotated signal is then modulated using either carrierless amplitude/phase (CAP) modulation or any uncoded modulation scheme such as uncoded quadrature amplitude modulation (QAM), or pulse amplitude modulation (PAM), and then transmitted over a communication channel comprising a conventional wire pair. In the case of PAM modulation, the signal space is onedimensional instead of multidimensional as in QAM, however, the concepts of the present invention are equally applicable thereto. At a receiver, the transmitted phase rotated signal is received and demodulated in accordance with techniques that are known in the art of modem communications. A phase decoder which includes a phase slicer operates on the received signal and supplies a signal to a vector rotation operator which provides a derotation vector. The derotation vector is combined with the circular signal space constellation in a rotator which recovers the mapped N−2 bit vector representing the N−2 bit word. Optionally, the output of the phase slicer is supplied to a differential decoder which develops 2 differential bits in order to recover the 2 additional phase bits of the N bit word. The 2 differential bits are subtracted from the output of the phase slicer and input to a register. As in the transmitter, the register can include a device such as a modulus converter, or other means such as constellation switching or shell mapping in order to allow the transmission of fractional bit rates.

If a special marker symbol was included in the transmission, the register supplies the N bit word to a subtractor where a value of $2^N$ is subtracted from the N bit word. This output is then supplied to a marker decoder which will separate the special marker symbol from the received N bit word.

The multidimensional signal space constellation is then sliced, as is known in the art, in order to recover the mapped N−2 bit word. Lastly, the N−2 bits are combined with the 2 phase bits and, if scrambled, the N bit word is descrambled in order to output an unscrambled N bit word.

Various modulation techniques may benefit from the concepts and features of the present invention. For example, the present invention will function equally well using carrierless amplitude/phase (CAP) modulation, or any uncoded modulation such as uncoded QAM or uncoded PAM.

The invention has numerous advantages, a few of which are delineated hereafter, as merely examples.

An advantage of the present invention is that it enables to use of uncoded modulation, thus reducing processor cycles and improving data speed while requiring reduced processor power.

Another advantage of the present invention is that it reduces the transmit peak factor thus reducing susceptibility to harmonic distortion Another advantage of the present invention is that it provides improved shaping gain, thus reducing power required to transmit a given signal (by 0.2 dB.)

Another advantage of the present invention is the ability to transmit special marker signals as symbols added to the perimeter of a circular constellation.

Another advantage of the present invention is that it is simple in design, reliable in operation, and its design lends itself to economical mass production in modems.

Another advantage of the present invention is that it allows the use of a decision feedback equalizer in a receiver.

Other features and advantages of the present invention will become apparent to one with skill in the art upon examination of the following drawings and detailed description. It is intended that all such additional features and advantages be included herein within the scope of the present invention, as defined in the appended claims.

BRIEF DESCRIPTION OF THE DRAWINGS

The present invention, as defined in the claims, can be better understood with reference to the following drawings. The drawings are not necessarily to scale, emphasis instead being placed on clearly illustrating the principles of the present invention.

DETAILED DESCRIPTION OF THE PREFERRED EMBODIMENT

The present invention can be implemented in software, hardware, or a combination thereof. In the preferred embodiment, the elements of the present invention are implemented in software that is stored in a memory and that configures and drives a suitable digital signal processor (DSP) situated in the respective modem. However, the foregoing software can be stored on any computer-readable medium for use by or in connection with any suitable computer-related system or method. In the context of this document, a computer-readable medium is an electronic, magnetic, optical, or other physical device or means that can contain or store a computer program for use by or in connection with a computer-related system or method.

Figure 1B:
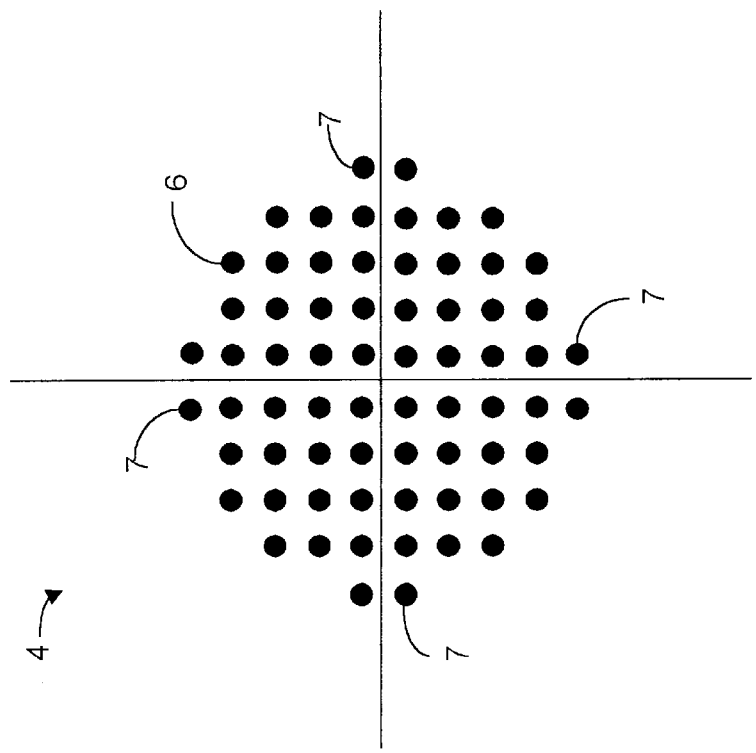
FIG. 1B is a graphical representation of a 64 point CAP circular signal space constellation including special marker symbols.
Figure 1A:
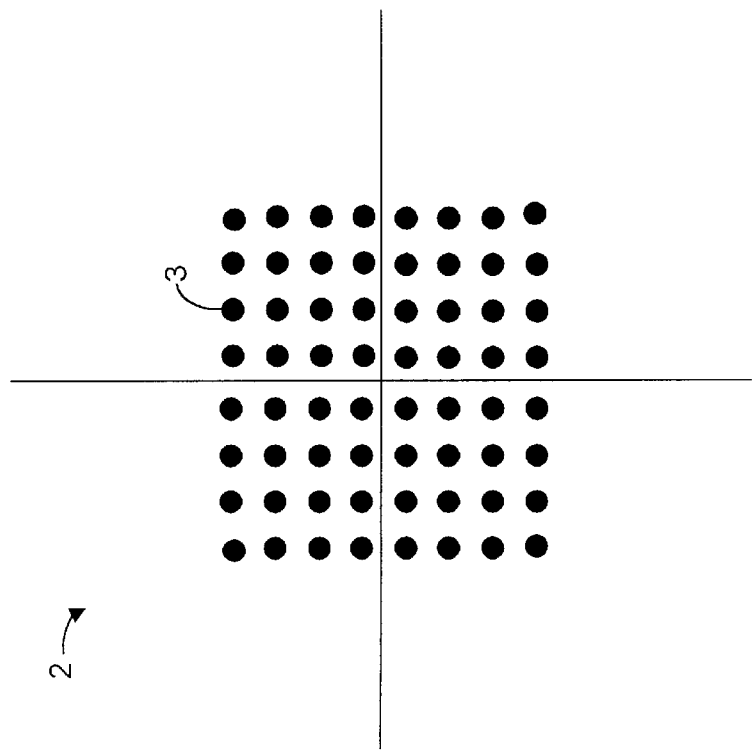
FIG. 1A is a graphical representation of a 64 point CAP square signal space constellation.

Referring now to FIG. 1A, shown is a graphical representation of a 64 point uncoded CAP square signal space constellation 2. The in-phase and quadrature samples developed by a CAP modulation scheme, as is known in the art, specify a location 3 in the signal space of FIG. 1A. The set of possible samples that a CAP modulator can produce corresponds to a set of sample points, or a constellation of points. For simplicity, a constellation of 64 points is described, however, as is known in the art, constellations with a larger number of signal points are possible.

Referring now to FIG. 1B, shown is a graphical representation of a 64 point uncoded CAP circular signal space constellation 4. As in a square constellation, the in-phase and quadrature samples developed by a CAP modulation scheme specify a location 6 in the signal space of FIG. 1B. For simplicity the circular constellation depicted in FIG. 1B contains 64 signal points, however many other configurations are possible. While the following preferred embodiment describes the generation of signal space constellations using uncoded carrierless amplitude/phase (CAP) modulation, other modulation techniques, such as uncoded QAM modulation, or uncoded PAM modulation can also benefit from the concepts and features of the present invention. In fact, any uncoded modulation technique can be used.

Figure 2:
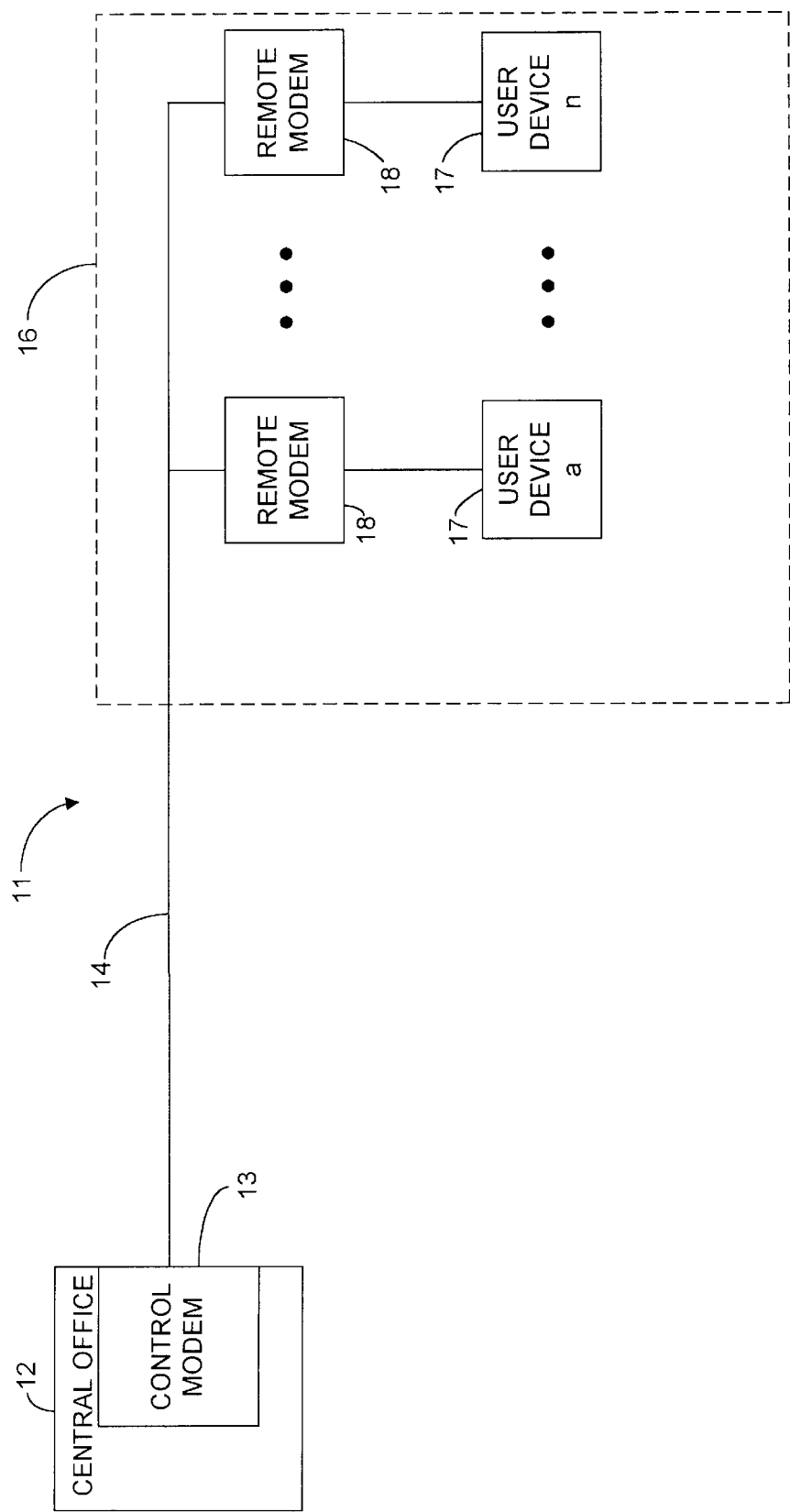
FIG. 2 is a schematic view of a multipoint communications channel including modems employing the concepts and features of the present invention.

Referring now to FIG. 2, shown is a view illustrating a multipoint communications channel in which modems 18 and 13 employing the concepts and features of the present invention are used. Remote location 16 is connected to central office location 12 and control modem 13 via communications channel 14. Channel 14 is typically the copper wire pair that runs between a telephone company central office and a remote residential, business, or any other location. Remote location 16 may contain a plurality of modems 18 connecting a plurality of user devices 17 to channel 14. Remote location 16 can be a residential, business, or other location served by conventional copper wire pair. By using modems 18 and 13 employing the concepts and features of the present invention, it is possible to transmit and receive data using circular constellations with uncoded modulation. While the following preferred embodiment is described with reference to modem 18, the concepts and features of the present invention are equally applicable to control modem 13.

Figure 3:
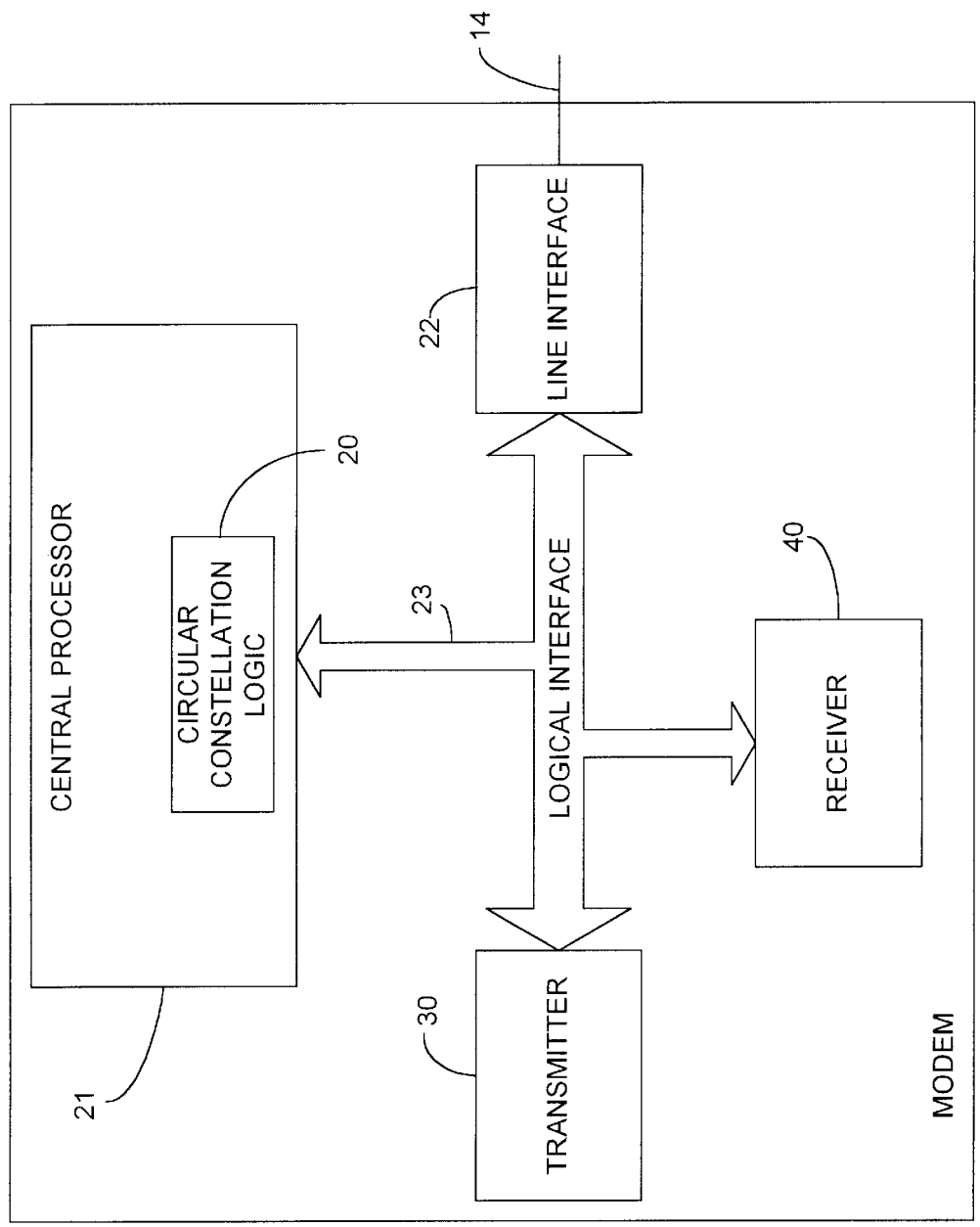
FIG. 3 is a schematic view illustrating a modem of FIG. 2 employing the concepts and features of the present invention.

Now referring to FIG. 3, shown is a schematic view illustrating a modem 18 of FIG. 2 employing the concepts and features of the present invention. Modem 18 contains conventional components as is known in the art of data communications. Central processor 21 controls the operation of the modems' transmitter 30 and receiver through logical interface 23, and contains logic 20 configured to enable transmitter and receiver 40 to communicate using circular signal space constellations and uncoded modulation. The components of the modem connect to communications channel 14 through line interface 22. By employing the concepts and features of the present invention, transmitting a circular constellation in an uncoded modulation scheme reduces the number of computational cycles performed by central processor 21 by 10–20%. This improvement arises from the omission of trellis coding, which consumes valuable processor cycles, and the reduction of the peak factor realized by the implementation of circular signal space constellations, resulting in an approximate 20% data rate increase with a commensurate 20% increase in available bandwidth.

Figure 4:
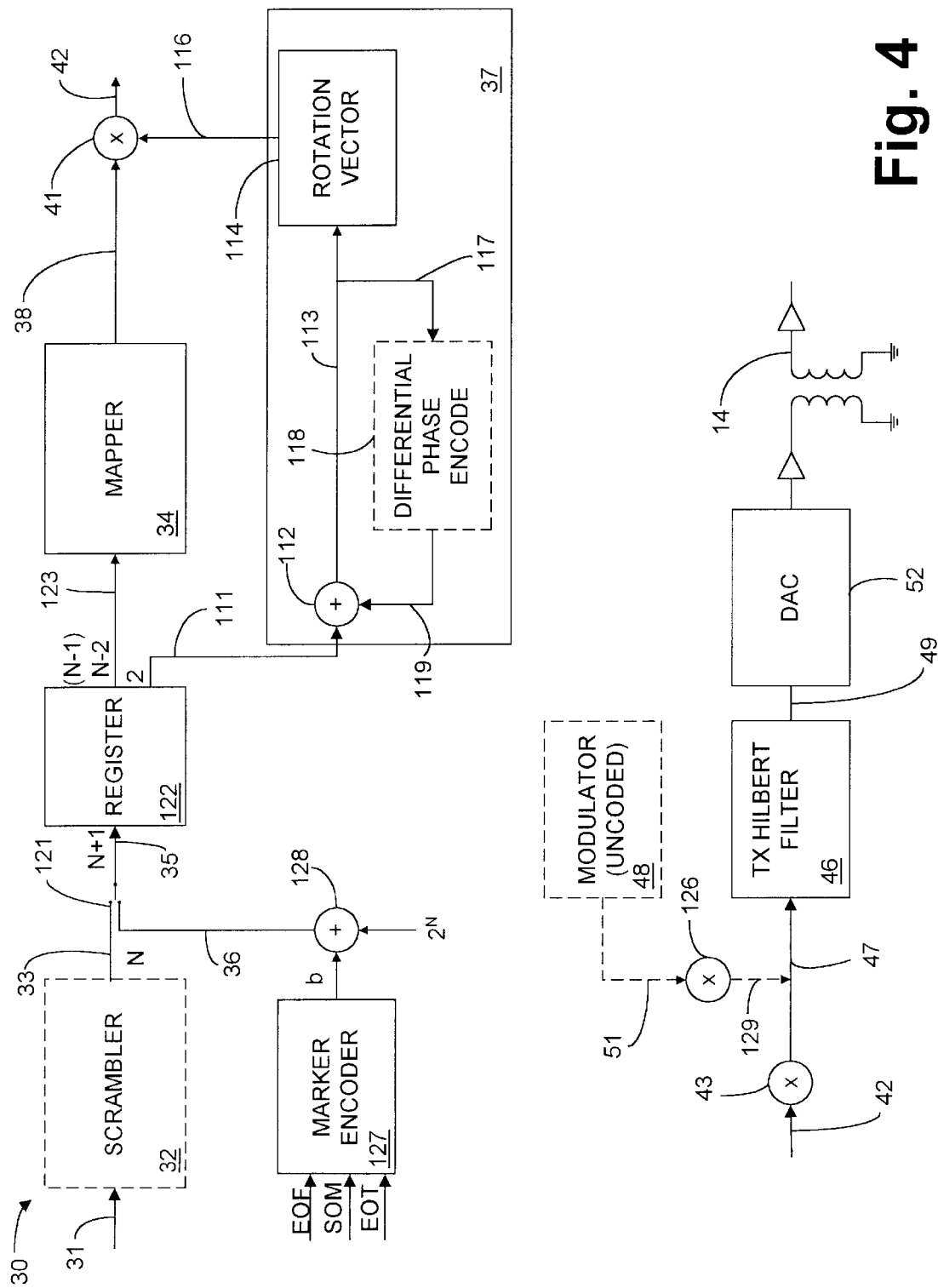
FIG. 4 is a schematic view of the transmitter section of the modem of FIG. 3.

With reference to FIG. 4, shown is a preferred embodiment of a transmitter 30 of modem 18 employing the concepts and features of the present invention. An ISA bus, a standard computer bus which eliminates the need for interfaces, supplies data, in the form of a data word that can be either 16 or 32 bits for the preferred embodiment, on line 33 to register 122. This data word is transformed into an N bit word by counting bits and shifting to arrive at a smaller number of bits, in this example, an N bit data word is segmented into an N−2 bit word and 2 additional bits. By employing a circular constellation, N can be any number. Optionally, in order to allow the transmission of fractional bit rates as is known in the art of data communications, register 122 can include a modulus converter or other means such as constellation switching or shell mapping. Modulus conversion is a well known technique in the art of communications for allowing the transmission of fractional bit rates, and is described in U.S. Pat. No. 5,103,227. Constellation switching allows the transmission of fractional bit rates by, for example, first transmitting 6 bits in one symbol and 7 bits in the next symbol if it is desired to transmit 6½ bits. For 6¾ bits one would transmit 7 bits per symbol for three symbol cycles and transmit 6 bits per symbol for the fourth symbol cycle. Shell mapping blocks the data into frames and a shell mapping algorithm, such as that described in the V.34 specification, is used to map the frames of data into a constellation of a certain size.

Optionally, the N bit word is first input on line 31 to scrambler 32. Scrambler 32 can be either a self synchronized scrambler or a preset free running scrambler as is known in the art. Depending on the application, the preset scrambler may have some advantage, as in the case of using Reed-Solomon coding. If scrambler 32 is employed, a scrambled N bit word is output on line 33.

Another feature of the present invention is the ability to easily and reliable include the transmission of special marker symbols in the circular signal space constellation. In order to transmit special marker symbols, marker encoder 127 supplies special marker symbols such as "End of File" (EOF), "Start of Message" (SOM) or "End of Transmission" (EOT) in the form of an encoded symbol "b". The encoded symbol is added in adder 128 to a value of $2^N$ and supplied to register 122 on line 36 alternatively with the output of scrambler 32 through switch 121. Switch 121 is logically controlled to include the special marker symbol as input to line 35 resulting in N+1 bits input to register 122.

The resulting N−2 bit word, or N−1 bit word if a special marker symbol is sent, on line 123 is supplied to mapper 34 which maps the N−2 bit word into a multidimensional circular signal space constellation, resulting in a mapped N−2 bit word, represented by a 2-dimensional vector, supplied on line 38 to rotator 41. In the case of the addition of special marker symbol b, the N−2 bit word on line 123 becomes an N−1 word. The N−2 bit word is enlarged by b resulting in the possibility of a word larger than N−2 if b is transmitted. By using a single mapper, the N−2 bit word can expand while still allowing the use of a single mapper table.

Next, the 2 additional bits on line 111 are operated upon by phase encoder 37. Phase encoder 37 is designed to develop a rotation vector 114 using the 2 additional bits supplied by the register. This rotation vector is output on line 116 and combined in rotator 41 with the mapped N−2 bit word on line 38 to form a phase rotated signal, thus creating the symmetric circular signal space constellation of the present invention.

Optionally, phase encoder 37 includes differential encoder 118 which encodes the 2 additional bits of the N bit word to develop 2 differential bits. These 2 differential bits are output on line 119 and combined with the 2 additional bits from register 122 in adder 112 and become part of the rotation vector 114.

Rotator 41 performs vector multiplication on the rotation vector on line 116 and the mapped N−2 bit vector word on line 38 to cause a phase rotation, thus producing the final quadrant symmetric circular signal space constellation of the present invention on line 42. The circular constellation on line 42 is supplied to scaler 43. Scaler 43 multiplies the circular constellation by a scale function of the data rate and supplies a complex number comprising X and Y values on line 47 to TX Hilbert filter 46. The scale function allows a single table to be used to implement the mapper at all data rates. TX Hilbert filter 46 operates on the signal to provide a carrierless amplitude/phase modulation (CAP) modulated signal on line 49 to digital-to-analog converter (DAC) 52. In an alternate embodiment of the present invention, the scaled circular constellation on line 47 is modulated using uncoded modulator 48, using a technique such as uncoded quadrature amplitude modulation (QAM) as is known in the art. Uncoded modulator 48 provides the sine and cosine components of a carrier frequency, or the X and Y values of the carrier frequency as is known in the art, on line 51 to multiplier 126. Multiplier 126 combines the X and Y components with the output of scaler 43 for input to TX Hilbert filter 46 which provides a bandpass output at a certain frequency range. The concepts and features of the present invention as claimed can be practiced using either CAP modulation or an uncoded modulation technique such as uncoded QAM or uncoded PAM.

The modulated signal on line 49 is supplied to digital to analog converter 52 for conversion to an analog signal that can be transmitted conventionally at various speeds over communication channel 14 as is known in the art.

The operation of the communications system disclosed thus far, i.e., up to TX Hilbert filter 46, occurs at the symbol rate of the modem, with the symbol rate equal to the bandwidth of the modem, thus allowing the use of reduced cost components. The output of TX Hilbert filter 46 and DAC 52 are computed at the sample rate, which is typically three times that of the symbol rate.

Figure 5A:
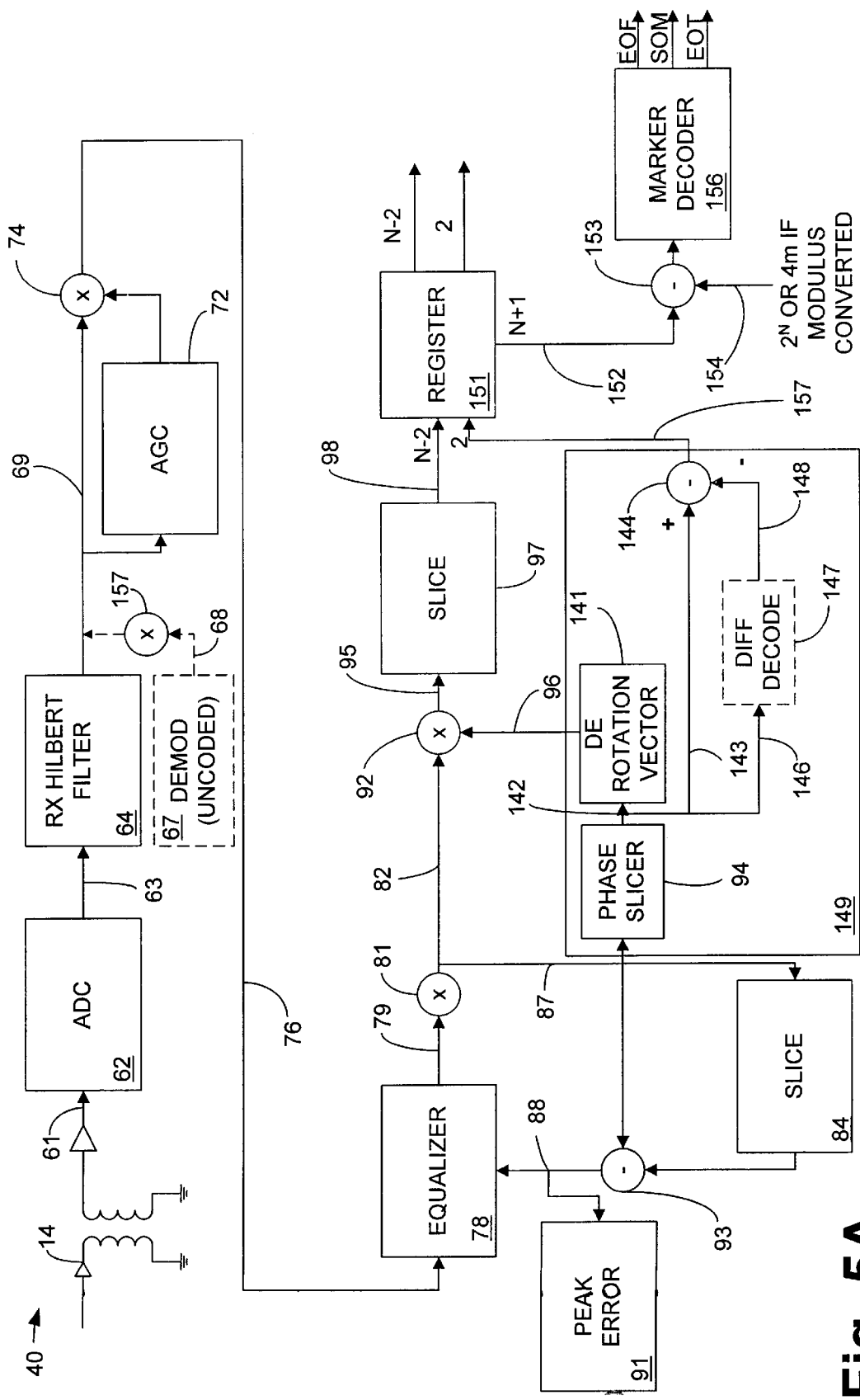
FIGS. 5A and 5B collectively illustrate a schematic view of the receiver section of the modem of FIG. 3.
Figure 5B:
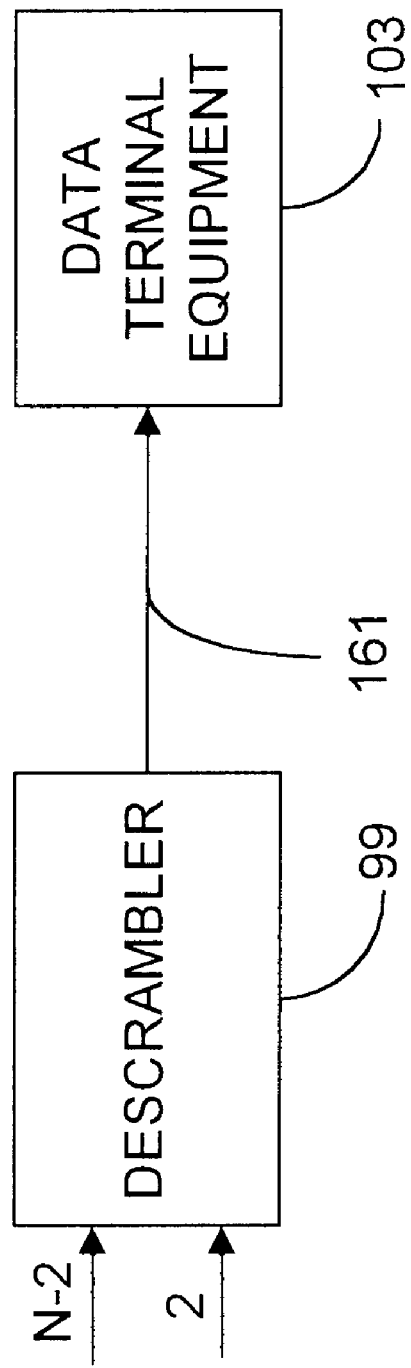

Now referring to FIGS. 5A and 5B collectively, shown is a schematic view of the receiver section 40 of the modem of FIG. 3. The received signal is input from communication channel 14 on line 61 to analog to digital converter (ADC) 62 for conversion to the digital domain as known in the art. The digital received signal is supplied on line 63 to RX Hilbert filter 64. The filtered signal is output from RX Hilbert filter 64 on line 69. In the case of uncoded QAM modulation, uncoded demodulator 67 provides the sine and cosine components of the carrier frequency on line 68 to multiplier 157 for combination with the output of RX Hilbert filter 64. The demodulated output is provided on line 69 to automatic gain control (AGC) circuit 72. AGC circuit 72 multiplies the demodulated received signal by gain factor 74. The AGC compensated signal is then supplied on line 76 to equalizer 78. Equalizer 78 is a known in the art finite impulse response (FIR) filter with adaptive coefficients.

The equalized decoded signal is supplied on line 79 to scaler 81 which operates on the received signal with a 1/scale factor. The 1/scale factor is a function of the data rate depending on the number of points in the constellation. The output of scaler 81 is the normalized X and Y components representing the values of the symbols in the circular signal space constellation.

The normalized output of scaler 81 is supplied to slicer 84, which performs the inverse operation of mapper 34. Because the signal is normalized, one slicer can be used for all data rates.

The output of scaler 81 is also supplied to adder 93 along with the output of slicer 84. Adder 93 subtracts the output of the 1/scale factor from the output of the slicer 84 to obtain an error signal which is supplied on line 88 to update finite impulse response (FIR) filter tap coefficients of equalizer 78.

The output of scaler 81 is also supplied to phase decoder 149 on line 87. Phase slicer 94 slices the circular signal space constellation to separate the 2 additional bits for input on line 142 to derotation vector operator 141. Derotation vector operator 141 outputs a derotation vector on line 96 which is combined with the circular constellation in rotator 92. As in the transmitter, phase decoder 149 optionally includes differential decoder 147 to decode the 2 additional bits if they were differentially encoded in the transmitter.

Differential decoder 147 develops 2 differential bits in order to recover the 2 additional bits of the N bit word. The 2 differential bits are subtracted in subtractor 144 from the output of the phase slicer 94 on line 143 and input to register 151. Differential decoder 147 eliminates the need for a trellis decoder, thus reducing processor cycles. In the absence of differential decoder 147, the 2 additional bits are passed through adder 144 on line 143 with nothing subtracted from them, essentially passing them directly to register 151. While uncoded modulation is more susceptible to errors (by approximately 3 dB) the larger bandwidth made available by the elimination of the trellis coder more than compensates for the 3 dB. For example, by doubling the bandwidth only ½ as many bits per symbol need be transmitted, thus N is really N/2 for transmitting the same data rate at double the bandwidth. Using N/2, less than half the number of points (order of 4) in the signal space constellation, i.e. removing 2 bits from N, the constellation is reduced by a factor of four, resulting in a 6 dB noise improvement. Reducing N by 1 is a 3 dB noise improvement. The improvement is realized by increased bandwidth is 3N/2 dB.

Rotator 92 receives the output of scaler 81 on line 82 and the output of derotation vector operator 141 on line 96. Rotator 92 multiplies the X and Y values from scaler 81 with the decoded 2 additional bits for rotation into the base constellation subset for input to slicer 97 on line 93.

Slicer 97 performs a mathematical operation in that it masks each axis to slice the axis. Slicer 97 then multiplies one of the axes of the constellation by a scale factor, and then adds the other masked axis value to the result, thus forming an index used as an address into a table known as the eye_slicer table. The output of the table is an integer less than m where for non-fractional bit encoding, $m=2^{N-2}$ and the integer is the N−2 bit data that was originally transmitted, which is then combined with the decoded 2 additional bits from phase decoder 149 in register 151 to form the decoded N bit word. If fractional rate coding is used then a modulus converter or other method, such as constellation switching or shell mapping is used to convert M integers to the K (N−2) bit data that was originally encoded.

If a special marker symbol was included in the transmission, register 151 supplies the N+1 bit word on line 152 to subtractor 153 where a value of $2^N$ is subtracted from the N+1 bit word. This output is then supplied to marker decoder 156 which will separate the special marker symbol from the received N+1 word.

If scrambler 32 was employed in transmitter 30, the N−2 bit word and the 2 additional bits, which are still scrambled, are supplied to descrambler 99 to be operated on to provide a descrambled N bit word on line 161 to data terminal equipment 103 as is known in the art. Descrambler 99 can be either a self synchronized scrambler or a preset free running scrambler as is known in the art similar to scrambler 32 in transmitter 30.

Another aspect of using circular constellations with uncoded modulation as disclosed herein is the ability to easily and reliably transmit special marker symbols such as End of File, Start of Message and End of Transmission. These special marker symbols are signal points added to the circular signal space constellation.

Square constellations, such as that illustrated in FIG. 1A encode exactly N bits in a constellation with $2^N$ points. This eliminates the possibility for transmitting any additional symbols. For example, the Tomlinson precoder used in CAP modulation requires square constellations to achieve the precoder modulo operation. Transmission of $(1+2^N)$ symbols would require a larger modulo, thus increasing the peak factor and dither power loss.

Using circular constellations, as disclosed herein and illustrated in FIG. 1B, to transmit B additional special marker symbols requires a constellation with exactly $(B+2^N)$ points. Special marker symbol 7 is illustrated in FIG. 1B as an End of File symbol, however any special marker symbol can be transmitted.

For normal data encoding the encoder uses the N-bit data word on line 31 as an index into the encoder table txencod shown in the program hereinafter set out in detail in appendix A. For any special marker symbol the same table is used and the symbol b is encoded using the index $(b+2^N)$ where b is any integer between 0 and (B−1) allowing for exactly B special marker symbols. For differential encoding by differential phase encoder 118 the N-bit data word is partitioned into an (N−2) bit index into the table for the coordinates of the subset constellation point and the 2 least significant bits are differentially encoded and define the rotation 0, 90, 180, or 270 degrees to be applied to the subset constellation. Then, for any special marker symbol b, the index into the table is $(b/4+2^{(N-2)})$ to identify the subset point which is then rotated by the last state of differential phase encoder 118. The special marker symbols could also be used to drive phase encoder 37. For each set k of 4 or fewer special marker symbols, the subset index is $2^{(N-2)}$ where k defines the rotation and is any integer 0, 1, 2, or 3.

In the receiver, special marker symbols are detected by subtracting a value of $2^N$ from the output of slicer 97. If the result is equal to or greater than zero then a special marker symbol was received and the result is the index of the special marker symbol.

Special marker symbols should be chosen by decreasing order of frequency of occurrence. The most common special marker symbol will use the lowest index, which also has the lowest power. This method beneficially reduces overall transmit power. For example, multiple files may be sent before terminating transmission. In this case, the End of File marker would be assigned index 0 (lowest power), Start of Message would be assigned index 1, and End of Transmission would be assigned index 2 (highest power index). These special marker symbols may also be passed through the differential encoder or phase bits such that the first 4 markers all have the same power.

Referring back to FIG. 1B, shown is a circular constellation including special marker symbols. Included are 4 special marker symbols 7. As can be seen, these special marker symbols are transmitted as extra symbols in an existing circular constellation.

Set out in detail hereinafter in Appendix A is the program that defines the operation of the present invention.

It will be obvious to those skilled in the art that many modifications and variations may be made to the preferred embodiments of the present invention, as set forth above, without departing substantially from the principles of the present invention. For example, the circular constellation and special marker symbols of the present invention are useful in a system that uses trellis coding, and in another alternative, the equalizer of the present invention can include a decision feedback equalizer.

All such modifications and variations are intended to be included herein within the scope of the present invention, as defined in the claims that follow.

Hereinafter set out in Appendix A is the program that defines the operation of the present invention.

APPENDIX A

```
Routines to:
    1. Initialize modem for transmitting BITS per symbol.
    2. Independently sequence and control transmitter and receiver.
    3. Control initial training, holdover for polling and polling.
    4. Self synchronized scramble/descramble data.
    5. Differentially encode/decode constellation.
    6. Send and detect specail EOF control signals.
    7. Detect active signals and loss of signal.
    8. Automatically compensate for 0x0100 dc offset in Tiger CODEC.
12/18/96
    9. Loopback (LB) is active here & ram init.asm.
    10. Kurt's routines SIM_TRAIN ifdef & Equalizer tap preset for
dig. loop included
    11. 1/2/97 added agc_gain preset for digital loop, removed DELAY
from Tx Seq.
    12. Digital loopback now completely controled by SIM_TRAIN no
change to ram init.
        For the software simulator then also enable asm(" trap
20") in main loop.
    13. Send 16000 Hz tone then Phase Reversal & detect for initial
training.
    14. trap 20 NOT active for BTUD sim
*****************************************************************/
#define SIMONLY 0 /* 1 FOR SIMULATOR, 0 FOR HARDWARE, not required with
SIM TRAIN */
#define BITS 8 /* note range 3 to 10 max table 453x4 below */
    /* less than 7 requires L$$SRS from rts.lib, −i./ opt. */
#define MAXPACKET 1532*8/BITS /* max without header & crc */
#define SLICE_BITS 8        /* Bits used in slicer */
```

APPENDIX A-continued

```c
#define SLiCE_MAG (1<<SLICE_BITS) /* Error free margin is +- SLICE_MAG-1
*/
#define EQ_LENGTH 30        /* !!! defined in RAM.ASM as well !! */
#define TRNDELAY (EQ_LENGTH/3)-DELAY-1    /* Training delay for center
tap */
                /* Comment next line out to remove
SIM_TRAIN mode(for hardware) */
/*#define SIM_TRAIN 1 /* for short forced train to speed up simulation
*/
#ifdef SIM_TRAIN
    #define DELAY 9   /* DELAY = 9 to use hardware loopback (LB) in
RAM_INIT.ASM */
    #define ST 4         /* Length of initial silent period */
    #define TT 20        /* Length of initial tone */
  #define CORRDETIME 1 /* Number of successive symbols for tone detect
correlator */
    #define TRNTIME 8
  #define TRNHITIME 2
#else
    #define DELAY 23 /* Tx to Rx Throughput delay for center tap */
    #define ST 16000 /* Length of initial silent period */
    #define TT 32000 /* Length of initial tone */
  #define CORRDETIME 0x80 /* Number of successive symbols for tone
detect correlator */
    #define TRNTIME 32000
  #define TRNHITIME 100
#endif
  #define TRNLOTIME (TRNTIME-TRNHITIME)
/************ EXTERNAL FUNCTIONS AND VARIABLES
***********************/
extern void baudtiming();
extern void constellation();
extern void start();
    /* variables in asm are _eq_xout,_eq_yout,_eq_xerror,_eq_yerror;
*/
extern int eq_xout,eq_yout,eq_xerror,eq_yerror;
extern long eq_xcoef,eq_ycoef;
extern int eye_slicer[],txencod[];
extern int agc_beta;
extern long dc_offset; /* double precision dc offset compensation for
ADC */
extern long agc_gain;
extern long rcv_lvl;
extern int *rcv_ptr,*xmt_ptr,xmt_out;
extern int corrout;         /*tone detector correlator output */
extern int CntrTrib;      /* Control=0, Tributary=1 */
extern void init_interface(void); /* Host/HPI Initialization routine */
extern void check_interface(void); /* Host/HPI Interface routine    */
/************ FUCTION PROTOTYPES DEFINED HERE IN C
*******************/
void eqinit(void);           /* Equalizer initialization, also in
start.asm */
void txencode(void);    /* Transmit data mode encoder */
void rxdecode(void);    /* Receiver data mode decoder */
void rxfreeze(void);    /* Receiver freeze mode decoder */
void (*txptr) (void);    /* Pointer for transmitter indirect function
call */
void (*rxptr) (void);    /* Pointer for receiver indirect function call
*/
/************ GLOBAL VARIABLES, DEFINED HERE IN C
*******************/
int bitsperbaud,eyesize,bitmask,rxscale,txscaie;
int intflag;                /* for hardware interrupts */
int x,y;                    /* complex transmit symbol */
int ttxd,txd,rxd;
int subset,eyeclosure;   /* used to detect loss of signal */
int xerror,yerror,peakerrortmp,peakerror,errorcnt;   /* diagnostic
variables */
int twosecblocks,pollcount,errorfree2sec;    /* Counter for 2 second
blocks, polls */
int sparecyclecnt,sparecycles;              /* Counter for spare cycles
per symbol */
int txphasebits,oldifencode,oldifdecode,rxphasebits; /* VARIABLES */
long int scram,descram,tmp;
int seqcntr,seqstate,seqtxcntr,seqrxcntr;       /* sequence state
counter */
int eq_beta;
int corrcnt;
int retraincount, retrainflag;
```

APPENDIX A-continued

```
/****************** Baud timing variables defined next *********/
extern int   iphaseReference[];
const int    *iphaseRefPtr;
int          iPhaseError,iPeakPhaseError=0;
long int     lBPFilter,1Freqoffset,1FreqOffsetLock, 1LoopIntegrator;
/***************Rx & Tx Power Scale Table ******************/
/* Net is rxscale*txscale = 2**25 expecting Tx scale of <<5 */
/* FRCT=1: t *= txscale/2**15, r *= rxcale/2**15, net *= 2**(-5) */
/* Expected left shift 5 in the transmitter for unity tx*rx gain */
/* Note the 2 bits/baud training uses SLICE MAG<<2 which is 4X larger */
/* Error below is for average, not all constellation points */
const int rxtxscale[24] = {
/* rxsci     txsci         RMS ERROR */
    3206,   10464, /*     1.000, 0.00020,       1 subset, ^2 bits/baud
(x<<2) */
    1388,   24167, /*     3.000, 0.00032,       2 subset, ^3 bits/baud */
    1792,   18720, /*     5.000, 0.00024,       4 subset, ^4 bits/baud */
    2534,   13237, /*    10.000, 0.00035,       8 subset, ^5 bits/baud */
    3629,    9245, /*    20.500, 0.00013,      16 subset, ^6 bits/baud */
    5124,    6547, /*    40.875, 0.00023,      32 subset, ^7 bits/baud */
    7231,    4640, /*    81.375, 0.00008,      64 subset, ^8 bits/baud */
   10237,    3277, /*   163.094, 0.00023,     128 subset, ^9 bits/baud */
   14470,    2318, /*   325.891, 0.00039,     256 subset, 10 bits/baud */
   20467,    1639, /*   651.969, 0.00027,     512 subset, 11 bits/baud */
   28944,    1159, /*  1303.797, 0.00025,    1024 subset, 12 bits/baud */
  -24603,     819, /*  2607.570, 1.60051,    2048 subset, 13 bits/baud */
} /* END of rxtxscale */
;
/*============================================================================*/
/*       differential encoder/decoder tables */
/* input lookup is y2n y1n y2n-1 y1n-1*/
/* output is q2n q1n*/
/*============================================================================*/
/*differential encoder tables*/
/* input lookup is q2n q1n y2n-1 y1n-1*/
/* output is y2n y1n*/
const int difc[16] = { /* coded table*/
    0,  1,  2,  3,
    1,  2,  3,  0,
    2,  3,  0,  1,
    3,  0,  1,  2,
    } ;
/* differential decoder tables */
/* input lookup is y2n y1n y2n-1 y1n-1*/
/* output is q2n q1n*/
const int decc[16] = { /* coded table*/
    0,  3,  2,  1,
    1,  0,  3,  2,
    2,  1,  0,  3,
    3,  2,  1,  0,
    } ;
/****************** SUBROUTINES *********************************/
/************ SIMPLE UNCODED DIFFERENTIAL ENCODE AND ROTATE
**************/
void differential_rotate(
    int input,   /* input 2 dif encode bits */
    int *x,      /* input subset x, output full constellation */
    int *y)      /* input subset y, output full constellation */
{            /* differential encoder input I2,I1 */
    int i, temp;
    i = oldifencode = difc[((input&0x3)<<2)|oldifencode] ;
    while(i!=0) {           /* rotate constellation -90i deg*/
      temp = *x ; *x = *y ; *y = - temp
      --i ;
    }
    /* printf("\ninput %d, %x,%x  ",input,*x,*y); getch(); */
}
/*********** SIMPLE UNCODED DIFFERENTIAL DECODE AND DE-ROTATE
**************/
const int derotate_tb1[4] = { 0, 1, 3, 2 };
void differential derotate( /* DECODE FULL CONSTELLATION BACK TO SUBSET
*/
    int *x,   /* Rx x component */
    int *y )  /* Rx y component, both to be rotated to subset */
{
    int phase,xi,yi,temp ;
    xi = *x ; yi = *y ;     /* slice x and y */
```

APPENDIX A-continued

```
        xi = (xi>>(SLICE_BITS+1)) & 0x1 ; /* get second bit for rotation
*/
        yi = (yi>>(SLICE_BITS+1)) & 0x1
        phase = derotate_tb1[(xi<<1) + yi] ;    /* get rotation */
        rxphasebits = decc[((phase)<<2)|oldifdecode] ; /* differential
decode */
        oldifdecode = phase ;
        while(phase!=0) {         /* rotate constellation +90i deg */
          temp = *x ; *x = - *y ; *y = temp
          --phase ;
          }
        /* printf("\n rotate diff %d %x,%x  ",rxphasebits,*x,*y); getch();
*/
}
const long iEqXForced[] = {
  0x00298BE2, 0xFFFFCBA8, 0x02BC44FC, 0x000077EE, 0x03269536,
0x0004C49A,
  0x00547D1C, 0x0003589E, 0xF7A92566, 0x000394D4, 0xE76545D0,
0x00074352,
  0xD5A0A0AE, 0xFFFF55A8, 0x738D897E, 0x0001D7B4, 0xD5A0AA90,
0x00048A66,
  0xE765ECA0, 0x0000D418, 0xF7A90EA4, 0x0002E9B6, 0x005344CC,
0x00033078,
  0x032B1006, 0x0001851C, 0x02B9B79E, 0x000072BC, 0x00255592,
0x000214AE
};
const long 1EqYForced[] = {
  0xFFF9AC02, 0x00DE73F0, 0xFFE9B29C, 0xFDE72DF2, 0xFFDE8F72,
0xF9DA7214,
  0xFFDF1876, 0xF59BCA5C, 0xFFE9FBAC, 0xF54A34B6, 0xFFFC3F78,
0x06D29B46,
  0x000470B8, 0x5E0F1838, 0x000BFE5A, 0XA1C1E802, 0x0015FC2C,
0xF976959A,
  0xFFFB1B9C, 0x0B68E51E, 0xFFC6BAA8, 0x0AC24398, 0xFF990AE2,
0x058BF810,
  0xFF98E9AE, 0x00ABE4E6, 0xFFB4B2FC, 0xFD942830, 0xFFEAE72A,
0xFEEF0822
void vInstantTrain(void)
{
    int         i;
    long        *plXCoef = &eq_xcoef,
                *plYCoef = &eq_ycoef;
    const long  *plInitX = 1EqXForced,
                *plInitY = lEqYForced;
    rcv_ptr = xmt_ptr;
    for (i=0; i<EQ_LENGTH; i++) {
      *plXCoef++ = *plInitX++;
      *plYCoef++ = *plInitY++;
    }
    agc_gain = 0x498000;  /* preset agc for digital loop level */
      rcv_lvl = 0x6000000;
    agc_beta = 0;           /* lock agc */
}
void eqinit(void) {
#ifndef SIM_TRAIN
    int i;
    long *xptr,*yptr;
    xptr = &eq_xcoef; yptr = &eq_ycoef;
    for(i=0;i<EQ_LENGTH;++i)
      *xptr++ = 0x8000;
    }
    i = EQ_LENGTH
    while(i--) {
      *yptr++ = 0x8000;
    }
    xptr = &eq_xcoef + EQ_LENGTH - DELAY*3;
    yptr = &eq_ycoef + EQ_LENGTH - DELAY*3;
    if(SIMONLY) {          /* Preset the equalizer for the simulator
*/
      *xptr++ = 0x40008000; *yptr++ = 0x40008000;
      *xptr++ = 0x40008000; *yptr++ = 0xc0008000;
      }
#endif
}
/************ CONTROL SEQUENCER and TABLES FOR MODE TRAINING
typedef struct {
    int cnt;                      /* New sequence state count */
    void (*csptr) (void);  /* Pointer to change state routine */
    void (*ptr) (void);       /* Pointer for steady state indirect
```

APPENDIX A-continued

```
function call */
} seqtable;
seqtable *seqtxtblptr;   /* Pointer for tx sequencer indirect function
table */
seqtable *seqtxdataptr; /* Pointer for recall of seqtxtblptr for data
mode */
seqtable *seqrxtblptr; /* Pointer for rx sequencer indirect function
table */
seqtable *seqrxbase,*seqtxbase;   /* Pointer to recall retrain address
*/
/****************** STEADY STATE TRANSMIT MODULATION ROUTINES
**************/
void txencode(void) {
    static int i;
/*  i++; txd = i&bitmask ; */
    txd = bitmask ;        /* TEST DATA, TRANSMIT MARKS */
/*** Byte wise SCBAMBLER, shift input left, x23 ^ x18 ****/
/*** Note: scrambler uses constant BITS to avoid RTS.LIB low speed ***/
    tmp = ( scram>>(18-BITS) )^( scram>>(23-BITS) ) ^ txd ;
    scram = (scram<<BITS ) | bitmask&tmp;
    ttxd = bitmask&scram; /* ttxd is the scrambled data */
/***** DEBUG code below can be used to send single tones at plus 3 dB
*****/
                    /*************************
                        bitmask^0 = 4000 Hz and 20000
Hz
                        bitmask^1 = 8000 Hz ( and
24000 Hz at -31 dB)
                        bitmask^2 = 12000 Hz
                        bitmask^3 = 16000 Hz
                    *************************/
/** ttxd = bitmask^0x1; **/
/*** Next differential phase encode and map x,y outputs */
    txphasebits = ttxd&3;
    ttxd = ttxd>>2;        /* note this can combine with [] below */
    x = txencod[ttxd<<1]*SLICE_MAG;
        /* scale encoder for 2*SLICB_MAG-1 margin */
    y = txencod[(ttxd<<1)+1]*SLICE_MAG;
    differential rotate (txphasebits,&x,&y);
}   /* End txencode */
void txsilent(void) {       /* Transmit silence */
    x = 0;
    y = 0;
void tx16000(void) {
    x = SLICE_MAG<<2;
    y = SLICE_MAG<<2;
/***** Pick code below to send single tones at plus 3 dB *****/
                    /*************************
                        bitmask^0 = 4000 Hz and 20000
Hz
                        bitmask^1 = 8000 Hz ( and
24000 Hz at -31 dB)
                        bitmask^2 = 12000 Hz
                        bitmask^3 = 16000 Hz
                        3 = 4000 Hz and 20000 Hz
                        2 = 8000 Hz ( and 24000 Hz
at -31 dB)
                        1 = 12000 Hz
                        0 = 16000 Hz
                    *************************/
/*** Next differential phase encode and map x,y outputs */
    differential_rotate(0,&x,&y);
}   /* End tx16000 */
void txtrain(void) {        /* Transmit train mode encoder */
    int i,temp;
    /* force train 4-phase until count expires */
    tmp = (scram>>(18-2) )^(scram>>(23-2) ) ^ 0x3
    scram = ( scram<<2 ) | ( 0x3 & tmp );
    i = txd = 0x3 & scram; /* i is the scrambled data */
                    /*** Next phase encode and map
x,y outputs ***/
    x = SLICE_MAG<<2;
    y = SLICE_MAG<<2;
    while(i!=0) {        /* rotate constellation -90i deg*/
      temp = x ; x = y ; y = - temp ;
      --i
      }
}
void txEOF(void) {
```

APPENDIX A-continued

```
    ttxd = eyesize ;       /* TRANSMIT EOF SIGNAL */
/*** Next differential phase encode and map x,y outputs */
    txphasebits = ttxd&3;
    ttxd = ttxd>>2;        /* note this can combine with [] below */
    x = txencod[ttxd<<1]*SLICE_MAG;
                /* scale encoder for 2*SLICE_MAG-1 margin */
    y = txencod[(ttxd<<1)+1]*SLICE_MAG;
    differential_rotate(txphasebits,&x,&y);   /*WARNING, should freeze
diff encoder */
} */ end txEOF */
/***************** STEADY STATE RECEIVE DEMODULATION ROUTINES
**************/
void rxdecode(void) {   /* Receiver data mode decoder */
    int xi,yi,xri,yri,mask,slice;
    mask = -(SLICE_MAG<<2)
    xi = eq_xout;
    yi = eq_yout;
geterror:           /* FIRST SLICE FULL CONSTELLATION FOR ERROR */
    xri = (xi & (mask>>1)) + SLICE_MAG ;    /* ideal x */
    yri = (yi & (mask>>1)) + SLICE_MAG ;    /* ideal y */
    xerror = xri-eq_xout;          /* compute error
*/
    eq_xerror = (xerror+(1<<(eq_beta-1)))>>eq_beta; /* round & scale
error for Beta */
    if(abs(xerror)>peakerrortmp) peakerrortmp = abs(xerror); /* find
peak */
    yerror = yri-eq_yout;          /* compute error
*/
    eq_yerror = (yerror+(1<<(eq_beta-1)))>>eq_beta; /* round & scale
error for Beta */
    if(abs(yerror)>peakerrortmp) peakerrortmp = abs(yerror); /* find
peak */
/**** eq_xerror = 0; eq_yerror = 0; /*** FREEZE & LOCK EQUALIZER TEST
***/
    differential_derotate(&xi,&yi) ; /* slice and counter rotate */
            /* NEXT SLICE SUBSET CONSTELLATION */
    xri = ((xi+SLICE_MAG) & mask) + SLICE_MAG ; /* ideal x */
    yri = ((yi+SLICE_MAG) & mask) + SLICE_MAG ; /* ideal y */
    slice = (xri>>(SLICE_BITS+2)) - 24*(yri>>(SLICE_BITS+2));
    slice = slice + ((11*24(+12);
    subset = eye slicer[slice]; /* DECODED DATA */
    rxd = subset<<2;
    rxd += rxphasebits;     /* GET DIFFERENTIAL PHASE DECODED BITS */
    if(rxd<eyesize) { /* run scrambler only if rxd<eyesize */
        /* Byte wise DESCRAMBLER, shift input left, x23 ^ x18, first
get parity */
        tmp = ( descram>>(18-BITS) ) ^ ( descram>>(23-BITS) );
        descram = ( descram<< BITS ) | rxd ;
        rxd = bitmask & ( rxd ^ tmp ) ;   /* descram out from
descram LSB */
        if(rxd!=bitmask) {      /* test for errors, expect all
marks */
            if (errorcnt<32767) ++errorcnt;
            } /* end error count if */
        if( (!subset)         /* if smallest subset point, test
for closed eye */
            &( (abs(eq_xout) + abs(eq_yout) )<(SLICE_MAG>>1)) )
            {if(!(--eyeclosure)) {  /* decrement eye
closure counter */
                ++seqrxtblptr;     /* if zero,
advance to freeze Rx state */
                seqrxcntr = 1;
                rxptr = rxfreeze;
                }
            }
        else eyeclosure = 10;    /* reset counter, require 10
successive closed bauds */
        }       /* end of rxd<eyesize */
    else {             /* EOF was detected */
        ++seqrxtblptr;            /* advance to freeze Rx state, &
scrambler */
        seqrxcntr = 1;
        rxptr = rxfreeze;
}   /* end rxdecode */
void rxidle (void) {
    eq_xerror = 0;    /* clear error */
    eq_yerror = 0;
}
void rxtrain(void) {       /* Receiver train mode decoder */
```

APPENDIX A-continued

```
    int i,temp,x,y;
    /* force train 4-phase until count expires */
    tmp = (descram>>(18-2) ) ^ (descram>>(23-2) )  ^ 0x3 ;
    descram = ( descram<<2 ) | ( 0x3 & tmp );
    i = rxd = 0x3 & descram;        /* i is the scrambled data */
    x = SLICE_MAG<<2;
    y = SLICE_MAG<<2;
    while(i!=0) {               /* rotate constellation -90i deg*/
      temp = x ; x = y ; y = - temp
      --i ;
      }
    eq_xerror = -((eq_xout<<0)-x)>>eq_beta;   /* scale error for Beta
*/
    eq_yerror = -((eq_yout<<0)-y)>>eq_beta;
}
void rxfreeze(void) {    /* Receiver freeze mode decoder */
    int xi,yi,xri,yri,mask,slice,savephase;
    if(peakerror>=(SLICE_MAG-30)) {
/*       seqtxtblptr = seqtxbase;    /* Force Tx to send retrain as
well */
/*    seqtxcntr = 1; */
        retrainflag = 1;
      }
    mask = -(SLICE_MAG<<2)
    xi = eq_xout;
    yi = eq_yout;
    eq_xerror = 0;     /* clear error */
    eq_yerror = 0;
    savephase = oldifdecode;           /* save differential
phase while no signal */
    differential_derotate(&xi,&yi) ; /* slice and counter rotate */
        /* NEXT SLICE SUBSET CONSTELLATION */
    xri = ((xi+SLICE_MAG) & mask) + SLICE_MAG ; /* ideal x */
    yri = ((yi+SLICE_MAG) & mask) + SLICE_MAG ; /* ideal y */
    slice = (xri>>(SLICE_BITS+2)) - 24*(yri>>(SLICE_BITS+2)) ;
    slice = slice + ((11*24)+12) ;
    rxd = eye_slicer[slice]<<2 ; /* DECODED DATA */
    rxd += rxphasebits;       /* GET DIFFERENTIAL PHASE DECODED
BITS */
    if(rxd<(eyesize>>1)) {      /* freeze while rxd<eyesize/2, for
dropout recovery */
       oldifdecode = savephase;
       if(!errorcnt) errorfree2sec=twosecblocks; /* count error
free seconds */
      }
    else {
       seqrxtbiptr-=2;        /* return to normal Rx data state */
       seqrxcntr = 1;
       ++pollcount;           /* count polls */
       rxptr = rxdecode;
/*    peakerror = peakerrortmp;   /* copy 2 second peak error */
/*    peakerrortmp = 0;       /* clear temporary peak error
*/
      }
}  /* end rxfreeze */
void rxtonedet(void) { /* Receiver tone detector */
/*    lFreqOffset = lFreqOffsetLock; /* Hold during silence */
/*    dc_offset = 0; */
    if(rcv_lvl > 0x1000000)
    if(corrout>0x1000) {   /* Test tone detector correlator output */
       if(++corrcnt>CORRDETIME) {
          agc_beta = 0x600; /* Wait for tone to set AGC */
          #ifdef SIM_TRAIN
            agc_beta = 0;    /* Lock for simulator */
          #endif
          seqrxcntr = 1;    /* set counter to 1, end this state
on next symbol */
          ++seqrxtblptr;    /* advance pointer to detect end of
tone */
        }
      }
      else corrcnt = 0;
}
void rxprevdet(void) { /* Receiver phase reversal detector */
    if(corrout<0) {        /* Test tone detector output for phase
reversal */
       seqrxcntr = 1;   /* set counter to 1, end this state on
next symbol */
      }
```

APPENDIX A-continued

```
}
/************* TX State Transition Routines *************/
void stxinit(void) {
        scram = 0;
        oldifencode = 0;
        txscale = rxtxscale[1]; /* scale for 4 point train */
}
void stxprev(void) {
        oldifencode += 2;       /* 180 degree phase reversal
*/
        oldifencode &= 0x3;     /* mask result */
}
void stxtodata(void) {
        retrainflag = 0;        /* end of train, clear flag */
        txscale = rxtxscale[1+((bitsperbaud-2)<<1)];
        seqtxdataptr = seqtxtbiptr;   /* save pointer for
return to data mode */
}
void stxdata(void) {
      if(retrainflag) {
           seqtxtbiptr = seqtxbase; /* restart full training */
           seqtxcntr = 1;
           }
        else seqtxtbiptr = seqtxdataptr+1; /* restore pointer,
return to data mode */
}                   /* +1 to skip stxtodata
seqtxcntr reload */
void stxrepeat(void) {
        --seqtxtblptr;          /* Decrement pointer to
lock in this state */
}
void stxend(void) {
    seqtxcntr = 16;             /* reload sequence counter */
    --seqtxtblptr;              /* lock pointer at end of table */
}
/************* RX State Transition Routines *************/
void srxeqinit(void) {
        eq_beta = 2;
        /* agc_beta = 0x600; /** Removed, too much gain on BTUD
pilot **/
        descram = 0;
        oldifdecode = 0;
        rxscale = rxtxscale[0]; /* scale for 4 point train */
        eqinit();
        corrout = 0;
        corrcnt = 0;
}
void srxbeta1(void) {
        agc_beta = 0;
        eq_beta = 6;
}
void srxscale(void) {
        rxscale = rxtxscale[(bitsperbaud-2)<<1]; /* set next
baud eq scale */
        agc_beta = 0;
}
void srxtodata(void) {
  sparecycles = 32767; /* initialize minimum spare cycle count */
        errorcnt = 0;           /* clear error count */
        peakerror = 0;          /* clear peak error */
        peakerrortmp = 0;       /* clear temporary peak error
*/
        twosecblocks = 0;       /* Clear 2 second block
counter */
}
void srx2sec(void) {
        eq_beta = 5;            /* equalizer */
        peakerror = peakerrortmp;    /* copy 2 second peak
error */
/*      peakerrortmp = 0;       /* clear temporary peak
error */
        --seqrxtbiptr;          /* Decrement
pointer to lock in this state */
        ++twosecblocks;         /* Count 2 second
blocks */
}
void srxretrain(void) {
    lFreqOffsetLock = lFreqoffset; /* Hold during silence */
    seqrxtbiptr=seqrxbase;      /* Point to initial start-up state
```

APPENDIX A-continued

```
*/
    seqrxcntr = 1;
/*  seqtxtbiptr = seqtxbase;    /* Force Tx to send retrain as well
*/
/*  seqtxcntr = 1; */
    retrainflag = 1;        /* set flag, force Tx to return retrain */
    ++retraincount;
}
void srxtone(void) {
    retrainflag = 1;        /* No tone for 2 sec, set retrain flag */
/*  lFreqoffsetLock = lFreqoffset; /* Hold during silence */
/*  seqrxtblptr=seqrxbase; /* went too far back to Continue initial
start-up state */
/*  seqrxcntr= 1; */    /* this would clear corrcnt when srxeqinit
ran */
    --seqrxtblptr;            /* Continue initial start-up state
*/
    agc_beta = 0x600;        /* Release AGC */
void srxrepeat(void) {
        eq_beta = 5;            /* equalizer */
        --seqrxtblptr;          /* Decrement
pointer to lock in this state */
}
void srxend(void) {
    seqrxcntr = 16;   /* reload sequence counter */
    --seqrxtbiptr;          /* lock pointer at end of table */
void seqnop(void) {
/************ CONTROL SEQUENCER TABLES FOR MODEN TRAINING
*************/
        /*** The count is pre-decremented,
the count is ***/
        /*** the true number of symbols for
the state. ***/
seqtable seqtx[] = {
    /** COUNT, CHANGE STATE, STEADY STATE **/
    {   ST,             stxinit,        txsilent    },  /* Send
Silence */
    {   TT,             seqnop,         tx16000     },
    /* Send Tone */
    {   8,              stxprev,        tx1600      },  /*
Send Phase Reversal in Tone */
    {   TRNTIME,   stxinit,         txtrain       },  /* for now,
2 second training */
    {   1,              stxtodata,      txencode    },
    {   32000,          seqnop,         txencode    },  /*
normal data mode */
    {   1,              seqnop,         txEOF       },  /*
send EOF signal, freeze data */
    {   DELAY,          seqnop,         txsilent    },  /*
send silence, freeze data */
    {   1,              seqnop,         txEOF       },  /*
send EOF signal, return to data */
    {   MAXPACKET, stxdata,       txencode    },  /* return to data
mode */
    {   32000,          seqnop,         txencode    },
    {   32000,          stxrepeat,      txencode    },
    {   1,              stxend,         txencode    }   /*
Reset ptr, prevent leaving table! */
};
seqtable seqrx[] = {
    /** COUNT, CHANSE STATE, STEADY STATE **/
    {   32000,          srxeqinit,      rxtonedet   },  /* Wait
DELAY + silence time */
    {   32000,          srxtone,        rxtonedet   ,   /* Wait for
tone */
    {   CORRDETIME, seqnop,            rxidie      },  /*
Wait for agc to settle */
    {   TT,             seqnop,         rxprevdet   },  /*
Wait DELAY + silence time */
    {   8+2,            seqnop,         rxidle      },  /*
Wait for 8 prev's & center tap */
    {   TRNLOTIME, seqnop,              rxtrain     },  /*
Train Equalizer */
    {   TRNHITIME-1,srxbetal,     rxtrain          },  /* Change
Equalizer Beta */
    {   1,              srxscale,       rxtrain     },
    {   32090,          srxtodata,      rxdecode    },  /* normal Rx
data mode */
    {   MAXPACKET-99,srx2sec,    rxdecode     },    /* repeat data
```

APPENDIX A-continued

```
mode, measure error
    /* rxdecode will detect EOF and
  advance to the freeze state */
    {    8000,           seqnop,            rxfreeze    },  /* repeat
freeze mode, until EOF */
{         1,                srxretrain,    rxfreeze    },  /* after .25
sec silence, retrain */
    {    1,                     srxend,         rxdecode    }     /*
Reset ptr, prevent leaving table! */
} ;
/************ END OF CONTROL SEQUENCER TABLES
************************/
/****************** BEGIN MAIN PROGRAM
********************************/
void main() {
    int i=0,ttxd,xi,yi,xri,yri,mask,slice;
    start();
#ifdef SIM_TRAIN
    vInstantTrain();
#endif
/************ Initialize Control Sequencers *************/
    seqtxtblptr = seqtxbase = seqtx-1; /* initialize seqencer pointer to
table base */
    seqtxcntr = 1; /* execute first state one symbol time */
    seqrxtblptr = seqrxbase = seqrx-1; /* initialize seqencer pointer to
table base */
    seqrxcntr = 1; /* execute first state one symbol time */
    txptr = txencode;     /* set normal data mode */
    rxptr = rxdecode;
/*********** Initialize Baud Timing *************/
    iphaseRefptr        = &iPhaseReference[0]; /* Initialize Baud
Timing */
    iPhaseError         = 0;
    lBPFilter           = 0;
    lFreqOffset         = 0;
    lFreqOffsetLock = 0;
    lLoopIntegrator     = 0;
/************ Initialize Data Variables *************/
    intflag = 0;        /* for hardware interrrupts */
    bitsperbaud = BITS;
    eyesize = 1<<bitsperbaud;
    bitmask = eyesize -1;
    rxscale = rxtxscale[(bitsperbaud-2)<<1];
    txscale = rxtxscale[1+((bitsperbaud-2)<<1)];
    dc_offset = 0;      /* double precision dc offset compensation for
ADC */
    eq_beta = 6;
    pollcount = 0;      /* clear poll counter */
    retraincount = 0;
    twosecblocks = 0;       /* clear count of 2 sec blocks of actual
Rx data */
    errorfree2sec = 0;      /* store twosecblocks here until first error */
    sparecycles = 32767;    /* initialize minimum spare cycle count */
    /* PUT CALL TO HPI_DP INTERFACE INITIALIZATION FUNCTION HERE JQC */
#ifndef SIM TRAIN
    init_interface();
#endif
                    /* also, initialized in srxtodata to
skip init time */
while (1) {     /* continuous loop */
        /* PUT CALL TO HPI_DP HERE JQC */
#ifndef SIM_TRAIN
    check_interface ();
#endif
/*********** GENERATE 3 INTERRUPT SAMPLES, EQ RUNS WITH tx_hil *****/
    if(SIMONLY) {
    asm(" trap     20");
        }
/********** CODE ASOVE FOR SIMULATOR, BELOW FOR HARDWARE **********/
    else {
#ifdef SIM_TRAIN
/*******/
    asm(" trap    20"); /******** NEEDED FOR TI EVM BOARD FOR INTERRUPT
***/
#endif
        sparecyclecnt = 0;
    while(!intflag) sparecyclecnt+=10; /* Count spare cycles per
symbol. */
                    /* 40,000/16 = 2500 cycles per
```

APPENDIX A-continued

```
symbol. */
                        /* Each count is 10 cycles in
wait loop. */
    if (sparecyclecnt<sparecycles) sparecycles=sparecyclecnt;
    intflag=0;
    }
/************* ABOVE FOR HARDWARE INTERRUPTS **************/
    baudtiming();
    if(iPhaseError<iPeakPhaseError) iPeakPhaseError=iPhaseError;
/********** NEW TX SEQUENCE CONTROLLER ******************/
    if(!(--seqtxcntr))    /* if counter decrements to zero, change
state */
        {
        ++seqtxtblptr;              /* advance to next
state */
        seqtxcntr = seqtxtblptr->cnt;    /* reload the counter */
        txptr =    seqtxtblptr->ptr;    /* reload steady state
pointer */
        (*(seqtxtblptr->csptr)) ();      /* call change state
routine +/
/********** NEW RX SEQUENCE CONTROLLER ******************/
    if(!(--seqrxcntr))    /* if counter decrements to zero, change
state */
        {
        ++seqrxtbiptr;                  /* else, advance
to next state */
        seqrxcntr = seqrxtblptr->cnt;    /* reload the counter */
        rxptr =    seqrxtblptr->ptr;    /* reload steady state
pointer */
        (*(seqrxtblptr->csptr)) ();      /* call change state
routine */
        }
/*********** TRANSMIT ENCODER ***********************/
    (*txptr) ();          /* call transmit encoder */
/*********** ENCODE ABOVE, DECODE BELOW ****************/
    (*rxptr) ();          /* call receive decoder */
    }  /* END OF WHILE(1) */
}       /* END OF MAIN */
/************* CONSTANT LOOK UP TABLES
**************************************/
            /* POWER INDEXED 4-D SUBSET */
const int cye_slicer[576] = {
   0,   0,   0,   0,   0,   0,   0,   0, 441, 420, 408, 396, 394, 400, 414, 427,   0,   0,   0,   0,   0,   0,   0,   0,
   0,   0,   0,   0,   0,   0, 429, 398, 375, 349, 339, 329, 326, 335, 347, 359, 386, 416, 451,   0,   0,   0,   0,   0,
   0,   0,   0,   0,   0, 412, 371, 340, 314, 290, 279, 269, 265, 273, 281, 302, 322, 353, 390, 430,   0,   0,   0,   0,
   0,   0,   0,   0, 401, 357, 318, 282, 257, 236, 224, 216, 212, 218, 228, 247, 270, 298, 337, 378, 424,   0,   0,   0,
   0,   0,   0, 406, 350, 306, 266, 234, 206, 185, 173, 164, 162, 170, 181, 197, 220, 253, 288, 327, 379, 431,   0,   0,
   0,   0, 421, 360, 310, 263, 226, 193, 165, 146, 133, 123, 121, 125, 137, 154, 179, 207, 242, 289, 338, 391, 452,   0,
   0, 447, 384, 324, 277, 229, 189, 156, 131, 110,  96,  87,  83,  92, 100, 117, 140, 172, 208, 254, 299, 354, 417,   0,
   0, 418, 355, 294, 243, 201, 160, 126,  98,  79,  64,  58,  54,  62,  71,  90, 112, 141, 180, 221, 271, 323, 387,   0,
   0, 392, 330, 274, 222, 177, 435, 102,  77,  55,  41,  35,  31,  37,  48,  65,  91, 118, 155, 198, 248, 303, 361, 428,
 448, 380, 316, 255, 203, 158, 119,  84,  60,  39,  24,  17,  15,  20,  30,  49,  72, 101, 138, 182, 230, 283, 348, 415,
 439, 367, 304, 244, 194, 148, 108,  75,  50,  28,  13,   6,   4,   8,  21,  38,  63,  93, 127, 171, 219, 275, 336, 402,
 432, 362, 296, 238, 186, 142, 103,  69,  43,  22,   9,   1,   0,   5,  16,  32,  56,  85, 122, 163, 213, 267, 328, 395,
 437, 365, 300, 240, 190, 144, 106,  73,  45,  25,  11,   3,   2,   7,  18,  36,  59,  88, 124, 166, 217, 272, 331, 397,
 445, 372, 307, 251, 199, 152, 113,  80,  52,  33,  19,  12,  10,  14,  26,  42,  66,  97, 134, 174, 225, 280, 341, 409,
   0, 388, 320, 261, 210, 167, 128,  94,  67,  47,  34,  27,  23,  29,  40,  57,  81, 111, 147, 187, 237, 291, 351, 422,
   0, 410, 343, 284, 232, 183, 149, 115,  89,  68,  53,  46,  44,  51,  61,  78,  99, 232, 168, 209, 258, 315, 376, 442,
   0, 433, 369, 311, 259, 214, 175, 139, 116,  95,  82,  74,  70,  76,  86, 104, 129, 157, 195, 235, 285, 342, 399,   0,
   0,   0, 403, 345, 292, 249, 205, 176, 150, 130, 114, 107, 105, 109, 120, 136, 161, 191, 227, 268, 319, 373, 434,   0,
   0,   0, 443, 382, 332, 287, 250, 215, 184, 169, 153, 145, 143, 151, 159, 178, 202, 231, 264, 308, 358, 413,   0,   0,
   0,   0,   0, 425, 377, 333, 293, 260, 233, 211, 200, 192, 188, 196, 204, 223, 245, 278, 312, 352, 404,   0,   0,   0,
   0,   0,   0,   0, 426, 383, 346, 313, 286, 282, 252, 241, 239, 246, 256, 276, 295, 325, 363, 407,   0,   0,   0,   0,
   0,   0,   0,   0,   0, 444, 405, 370, 344, 321, 309, 301, 297, 305, 317, 334, 356, 385, 423,   0,   0,   0,   0,   0,
   0,   0,   0,   0,   0,   0,   0, 435, 411, 389, 374, 366, 364, 368, 381, 393, 419, 449,   0,   0,   0,   0,   0,   0,
   0,   0,   0,   0,   0,   0,   0,   0,   0, 446, 438, 436, 440, 450,   0,   0,   0,   0,   0,   0,   0,   0,   0,   0
}
;
        /*          Power indexed encode table (x,y).       */
const int txencod[906] = {
/*  0*/    1,   1,    -3,   1,      1, -3,     -3, -3,
/*  4*/    1,   5,     5,   1,     -3,  5,      5, -3,
/*  8*/    5,   5,    -7,   1,      1, -7,     -7, -3,
/* 12*/   -3,  -7,    -7,   5,      5, -7,      1,  9,
/* 16*/    9,   1,    -3,   9,      9, -3,     -7, -7,
/* 20*/    5,   9,     9,   5,    -11,  1,      1,-11,
/* 24*/   -7,   9,   -11,  -3,      9, -7,     -3,-11,
/* 28*/  -11,   5,     5,-11,       9,  9,      1, 13,
/* 32*/   13,   1,   -11,  -7,     -7,-11,     -3, 13,
```

APPENDIX A-continued

```
/* 36*/    13, -3,    5, 13,   13,  5,  -11,  9,
/* 40*/     9,-11,   -7, 13,   13, -7,  -15,  1,
/* 44*/     1,-15,  -15, -3,   -3,-15,  -11,-11,
/* 48*/     9, 13,   13,  9,  -15,  5,    5,-15,
/* 52*/   -15, -7,   -7,-15,    1, 17,  -11, 13,
/* 56*/    17,  1,   13,-11,   -3, 17,   17, -3,
/* 60*/   -15,  9,    9,-15,    5, 17,   17,  5,
/* 64*/    -7, 17,   13, 13,   17, -7,  -15,-11,
/* 68*/   -11,-15,  -19,  1,    1,-19,    9, 17,
/* 72*/    17,  9,  -19, -3,   -3,-19,  -19,  5,
/* 76*/     5,-19,  -15, 13,   13,-15,  -11, 17,
/* 80*/   -19, -7,   17,-11,   -7,-19,    1, 21,
/* 84*/   -19,  9,   21,  1,    9,-19,   -3, 21,
/* 88*/    21, -3,  -15,-15,   13, 17,   17, 13,
/* 92*/     5, 21,   21,  5,  -19,-11,  -11,-19,
/* 96*/    -7, 21,   21, -7,  -15, 17,   17,-15,
/*100*/     9, 21,   21,  9,  -19, 13,  -23,  1,
/*104*/    13,-19,    1,-23,  -23, -3,   -3,-23,
/*108*/   -23,  5,    5,-23,  -11, 21,   21,-11,
/*112*/    17, 17,  -23, -7,   -7,-23,  -19,-15,
/*116*/   -15,-19,   13, 21,   21, 13,  -23,  9,
/*120*/     9,-23,    1, 25,   25,  1,   -3, 25,
/*124*/    25, -3,    5, 25,  -19, 17,   25,  5,
/*128*/   -23,-11,   17,-19,  -11,-23,  -15, 21,
/*132*/    21,-15,   -7, 25,   25, -7,  -23, 13,
/*136*/    13,-23,    9, 25,   25,  9,  -19,-19,
/*140*/    17, 21,   21, 17,  -27,  1,    1,-27,
/*144*/   -27, -3,   -3,-27,  -11, 25,   25,-11,
/*148*/   -27,  5,  -23,-15,  -15,-23,    5,-27,
/*152*/   -27, -7,   -7,-27,   13, 25,   25, 13,
/*156*/   -19, 21,   21,-19,  -27,  9,    9,-27,
/*160*/   -23, 17,   17,-23,    1, 29,   29,  1,
/*164*/    -3, 29,  -15, 25,   29, -3,  -27,-11,
/*168*/    25,-15,  -11,-27,    5, 29,   29,  5,
/*172*/    21, 21,   -7, 29,   29, -7,  -23,-19,
/*176*/   -19,-23,  -27, 13,   13,-27,   17, 25,
/*180*/    25, 17,    9, 29,   29,  9,  -27,-15,
/*184*/   -15,-27,  -11, 29,  -31,  1,   29,-11,
/*188*/     1,-31,  -23, 21,  -31, -3,   21,-23,
/*192*/    -3,-31,  -19, 25,  -31,  5,   25,-19,
/*196*/     5,-31,   13, 29,   29, 13,  -31, -7,
/*200*/    -7,-31,  -27, 17,   17,-27,  -31,  9,
/*204*/     9,-31,  -23,-23,  -15, 29,   21, 25,
/*208*/    25, 21,   29,-15,  -31,-11,  -11,-31,
/*212*/     1, 33,   33,  1,  -27,-19,  -19,-27,
/*216*/    -3, 33,   33, -3,    5, 33,   33,  5,
/*220*/    17, 29,   29, 17,  -31, 13,   13,-31,
/*224*/    -7, 33,   33, -7,  -23, 25,   25,-23,
/*228*/     9, 33,  -27, 21,   33,  9,   21,-27,
/*232*/   -31,-15,  -15,-31,  -19, 29,   29,-19,
/*236*/   -11, 33,   33,-11,  -35,  1,    1,-35,
/*240*/   -35, -3,   -3,-35,   25, 25,  -31, 17,
/*244*/   -35,  5,   17,-31,    5,-35,   13, 33,
/*248*/    33, 13,  -27,-23,  -23,-27,  -35, -7,
/*252*/    -7,-35,   21, 29,   29, 21,  -35,  9,
/*256*/     9,-35,  -15, 33,   33,-15,  -31,-19,
/*260*/   -19,-31,  -35,-11,  -11,-35,  -27, 25,
/*264*/    25,-27,    1, 37,  -23, 29,   37,  1,
/*268*/    29,-23,   -3, 37,   17, 33,   33, 17,
/*272*/    37, -3,    5, 37,  -35, 13,   37,  5,
/*276*/    13,-35,  -31, 21,   21,-31,    7, 37,
/*280*/    37, -7,    9, 37,  -19, 33,   37,  9,
/*284*/   -35,-15,   33,-19,  -15,-35,  -27,-27,
/*288*/    25, 29,   29, 25,  -11, 37,   37,-11,
/*292*/   -31,-23,  -23,-31,  -35, 17,   17,-35,
/*296*/   -39,  1,    1,-39,   21, 33,   33, 21,
/*300*/   -39, -3,   -3,-39,   13, 37,   37, 13,
/*304*/   -39,  5,    5,-39,  -27, 29,  -39,  7,
/*308*/    29,-27,   -7,-39,  -31, 25,  -35,-19,
/*312*/    25,-31,  -19,-35,  -15, 37,   37,-15,
/*316*/   -39,  9,    9,-39,  -23, 33,   33,-23,
/*320*/   -39,-11,  -11,-39,   17, 37,   37, 17,
/*324*/   -35, 21,   21,-35,    1, 41,   29, 29,
/*328*/    41,  1,   -3, 41,  -39, 13,   41, -3,
/*332*/   -31,-27,  -27,-31,   13,-39,    5, 41,
/*336*/    41,  5,   25, 33,   33, 25,   -7, 41,
/*340*/   -19, 37,   41, -7,   37,-19,  -39,-15,
/*344*/   -15,-39,  -35,-23,  -23,-35,    9, 41,
/*348*/    41,  9,  -11, 41,  -31, 29,   41,-11,
```

APPENDIX A-continued

```
/*352*/   29,-31,    21, 37,    37, 21,   -39, 17,
/*356*/   17,-39,   -27, 33,   33,-27,    13, 41,
/*360*/  -35, 25,    41, 13,   -43,  1,   25,-35,
/*364*/    1,-43,   -43, -3,    -3,-43,  -43,  5,
/*368*/    5,-43,  -39,-19,   -19,-39,  -23, 37,
/*372*/  -43, -7,   37,-23,    -7,-43,  -15, 41,
/*376*/   41,-15,  -31,-31,    29, 33,   33, 29,
/*380*/  -43,  9,    9,-43,   -35,-27,  -27,-35,
/*384*/  -39, 21,   21,-39,    17, 41,   41, 17,
/*388*/  -43,-11,  -11,-43,    25, 37,   37, 25,
/*392*/  -43, 13,   13,-43,     1, 45,   45,  1,
/*396*/   -3, 45,   45, -3,   -19, 41,   41,-19,
/*400*/    5, 45,  -31, 33,    45,  5,  -39,-23,
/*404*/   33,-31,  -23,-39,   -35, 29,   29,-35,
/*408*/   -7, 45,   45, -7,   -43,-15,  -15,-43,
/*412*/  -27, 37,   37,-27,     9, 45,   45,  9,
/*416*/   21, 41,   41, 21,   -43, 17,   17,-43,
/*420*/  -11, 45,  -39, 25,    45,-11,   25,-39,
/*424*/   33, 33,  -35,-31,   -31,-35,   13, 45,
/*428*/   45, 13,  -23, 41,    29, 37,   37, 29,
/*432*/  -47,  1,  -43,-19,    41,-23,  -19,-43,
/*436*/    1,-47,  -47, -3,    -3,-47,  -47,  5,
/*440*/    5,-47,  -15, 45,    45,-15,  -39,-27,
/*444*/  -27,-39,  -47, -7,    -7,-47,  -43, 21,
/*448*/  -47,  9,   21,-43,     9,-47,   25, 41,
/*452*/   41, 25    /* 453*4 = 1812 point full constellation */
                };
```

Therefore, the following is claimed:

1. In a multipoint communication environment a system for communication in a modem using circular constellations, comprising:

a register configured to receive an N bit word and supply an N−2 bit word and 2 additional bits;

a mapper configured to map said N−2 bit word into a multidimensional circular signal space constellation, resulting in a mapped N−2 bit word;

a phase encoder designed to develop a rotation vector using said 2 additional bits;

a rotator designed to rotate said mapped N−2 bit word with said rotation vector, resulting in a phase rotated signal;

a modulator for modulating said phase rotated signal, wherein said modulator is an uncoded modulator, and wherein said register, said mapper, said phase encoder, said rotator, and said modulator operate at a rate corresponding to a symbol rate of said modem;

a transmitter for transmitting said phase rotated signal over a communication channel;

a receiver for receiving said transmitted phase rotated signal;

a demodulator for demodulating said received phase rotated signal;

a phase decoder designed to develop a derotation vector;

a rotator designed to derotate said phase rotated signal to recover said mapped N−2 bit word; and a slicer designed to recover said mapped N−2 bit word from said multidimensional circular signal space constellation, thereby resulting in a 3N/2 dB improvement in noise margin.

2. The system of claim 1, wherein said modulation comprises carrierless amplitude/phase (CAP) modulation.

3. The system of claim 1, wherein said uncoded modulation comprises uncoded pulse amplitude modulation (PAM).

4. The system of claim 1, further comprising a scrambler designed to supply a scrambled N bit word to said register.

5. The system of claim 1, wherein said phase encoder further comprises a differential encoder designed to differentially encode said 2 additional bits.

6. The system of claim 1, wherein said phase decoder further comprises a differential decoder designed to differentially decode said 2 additional bits.

7. The system of claim 1, further comprising a descrambler designed to supply a descrambled N bit word.

8. The system of claim 1, wherein said modulated signal is an analog signal.

9. In a multipoint communication environment a system for transmitting in a modem using circular constellations, comprising:

a register configured to receive an N bit word and supply an N−2 bit word and 2 additional bits;

a mapper configured to map said N−2 bit word into a multidimensional circular signal space constellation, resulting in a mapped N−2 bit word;

a phase encoder designed to develop a rotation vector using said 2 additional bits;

a rotator designed to rotate said mapped N−2 bit word with said rotation vector, resulting in a phase rotated signal;

a modulator for modulating said phase rotated signal, wherein said modulator is an uncoded modulator, and wherein said register, said mapper, said phase encoder, said rotator, and said modulator operate at a rate corresponding to a symbol rate of said modem; and a transmitter for transmitting said phase rotated signal over a communication channel.

10. The system of claim 9, wherein said modulation comprises carrierless amplitude/phase (CAP) modulation.

11. The system of claim 9, wherein said modulation comprises pulse amplitude modulation (PAM).

12. The system of claim 9, further comprising a scrambler designed to supply a scrambled N bit word to said register.

13. The system of claim 9, wherein said phase encoder further comprises a differential encoder designed to differentially encode said 2 additional bits.

14. In a multipoint communication environment a system for receiving in a modem using circular constellations, comprising:

a receiver for receiving a transmitted phase rotated signal;

a demodulator for demodulating said received phase rotated signal;

a phase decoder designed to develop a derotation vector using 2 additional bits;

a rotator designed to derotate said phase rotated signal to recover said mapped N–2 bit word; and a slicer designed to recover said mapped N–2 bit word from said multidimensional circular signal space constellation, thereby resulting in a 3N/2 dB improvement in noise margin.

15. The system of claim 14, wherein said phase decoder further comprises a differential decoder designed to differentially decode said 2 additional bits.

16. The system of claim 14, further comprising a descrambler designed to supply a descrambled N bit word.

17. In a multipoint communication environment a method for transmitting in a modem using circular constellations, comprising the steps of:

supplying to a register an N bit word, said register designed to supply an N–2 bit word and 2 additional bits;

mapping said N–2 bit word into a multidimensional circular signal space constellation, resulting in a mapped N–2 bit word;

phase encoding said circular signal pace constellation by developing a rotation vector using said 2 additional bits;

rotating said mapped N–2 bit word with said rotation vector, resulting in a phase rotated signal;

modulating said phase rotated signal, wherein said step of modulating comprises uncoded modulation, and wherein said step of supplying to a register, said step of mapping, said step of phase encoding, said step of rotating, and said step of modulating occur at a rate corresponding to a symbol rate of said modem; and transmitting said phase rotated signal over a communication channel.

18. The method of claim 17, wherein said modulation comprises carrierless amplitude/phase (CAP) modulation.

19. The method of claim 17, wherein said modulation comprises pulse amplitude modulation (PAM).

20. The method of claim 17, further comprising the step of a supplying a scrambled N bit word to said register.

21. The method of claim 17, wherein said step of phase encoding further comprising the step of differentially encoding said 2 additional bits.

22. In a multipoint communication environment a method for receiving in a modem using circular constellations, comprising:

receiving a transmitted phase rotated signal;

demodulating said received scaled phase rotated signal;

developing a derotation vector using 2 additional bits;

derotating said phase rotated signal to recover said mapped N–2 bit word; and slicing said mapped N–2 bit word in order to recover said N–2 bit word from said multidimensional circular signal space constellation, thereby resulting in a 3N/2 dB improvement in noise margin.

23. The method of claim 22, wherein said phase decoder further comprises a differential decoder designed to differentially decode said 2 additional bits.

24. The method of claim 22, further comprising a descrambler designed to supply a descrambled N bit word.

25. In a multipoint communication environment a computer readable medium having a program for transmitting in a modem using circular constellations, the program comprising:

means for supplying to a register an N bit word, said register designed to supply an N–2 bit word and 2 additional bits;

means for mapping said N–2 bit word into a multidimensional circular signal space constellation, resulting in a mapped N–2 bit word;

means for phase encoding said circular signal pace constellation by developing a rotation vector using said 2 additional bits;

means for rotating said mapped N–2 bit word with said rotation vector, resulting in a phase rotated signal;

means for modulating said phase rotated signal, wherein said means for modulating comprises uncoded modulation, and wherein said means for supplying to a register, said means for mapping, said means for phase encoding, said means for rotating, and said means for modulating operate at a rate corresponding to a symbol rate of said modem; and means for transmitting said phase rotated signal over a communication channel.

26. The computer readable medium of claim 25, wherein said modulation comprises carrierless amplitude/phase (CAP) modulation.

27. The computer readable medium of claim 25, further comprising means for supplying a scrambled N bit word to said register.

28. The computer readable medium of claim 25, further comprising means for differentially encoding said 2 additional bits.

29. In a multipoint communication environment a computer readable medium having a program for receiving in a modem using circular constellations, the program comprising:

means for receiving a transmitted phase rotated signal;

means for demodulating said received scaled phase rotated signal;

means for developing a derotation vector using 2 additional bits;

means for derotating said phase rotated signal to recover said mapped N–2 bit word; and means for slicing said mapped N–2 bit word in order to recover said N–2 bit word from said multidimensional circular signal space constellation, thereby resulting in a 3N/2 dB improvement in noise margin.

30. The computer readable medium of claim 29, wherein said phase decoder further comprises means for a differentially decoding said 2 additional bits.

31. The computer readable medium of claim 29, further comprising means for descrambling said N bit word.

* * * * *

United States Patent And Trademark Office
CERTIFICATE OF CORRECTION

PATENT NO. : 6,026,120
DATED : February 15, 2000
INVENTOR(S): William L. Betts

It is certified that error appears in the above-identified patent and that said Letters Patent is hereby corrected as shown below.

Col. 2, line 58 after "rates" insert -- , --.
Col. 3, line 64 delete "to" and substitute therefor -- the --.
Col. 5, line 30 after "by" add -- a --.
Col. 5, line 43 after "receiver" add -- 40 --.
Col. 5, line 45 after "transmitter" add -- 30 --.
Col. 6, line 27 delete "reliable" and substitute therefor -- reliably --.
Col. 7, line 10 delete "alternate" and substitute therefor -- alternative --.
Col. 8, line 36 delete "93" and substitute therefor -- 95 --.
Col. 8, line 49 after "mapping" insert -- , --.

Signed and Sealed this

Thirteenth Day of March, 2001

Attest:

NICHOLAS P. GODICI

Attesting Officer

Acting Director of the United States Patent and Trademark Office